US005692089A

United States Patent [19]
Sellers

[11] Patent Number: 5,692,089
[45] Date of Patent: Nov. 25, 1997

[54] MULTIPLE FIBER POSITIONER FOR OPTICAL FIBER CONNECTION

[75] Inventor: Gregory J. Sellers, Naperville, Ill.

[73] Assignee: Fotron, Inc., Naperville, Ill.

[21] Appl. No.: 630,153

[22] Filed: Apr. 11, 1996

[51] Int. Cl.[6] ................................................ G02B 6/00
[52] U.S. Cl. ........................... 385/137; 385/55; 385/59; 385/97; 385/98; 385/99; 385/136
[58] Field of Search .................... 385/52, 53, 55, 385/56, 59, 65, 71, 83, 95, 96, 97, 98, 99, 130, 131, 132, 136, 137

[56] References Cited

U.S. PATENT DOCUMENTS

| | | | |
|---|---|---|---|
| 3,864,018 | 2/1975 | Miller | 385/65 X |
| 4,645,296 | 2/1987 | Cattin et al. | 385/53 X |
| 4,662,962 | 5/1987 | Malavieille | 385/98 X |
| 4,934,785 | 6/1990 | Mathis et al. | 385/53 X |
| 4,950,048 | 8/1990 | Kakii et al. | 385/83 X |
| 4,973,126 | 11/1990 | Degani et al. | 385/53 X |
| 5,080,461 | 1/1992 | Pimpinella | 365/68 |
| 5,179,607 | 1/1993 | Sellers et al. | 385/70 |
| 5,343,544 | 8/1994 | Boyd et al. | 385/46 |
| 5,400,426 | 3/1995 | De Jong et al. | 385/95 |
| 5,513,290 | 4/1996 | Ishikawa et al. | 385/49 |

OTHER PUBLICATIONS

Gregory J. Sellers et al, "Micromachined multi-fiber optic splices", *SPIE*, vol. 2467, pp. 78–86 (17–18 Apr. 1995); and Gregory J. Sellers et al, "Multi-fiber optic connectors for aircraft applications", *SPIE*, vol. 2467, pp. 87–98 (17–18 Apr. 1995).

*Primary Examiner*—Brian Healy
*Attorney, Agent, or Firm*—Benman, Collins & Sawyer

[57] ABSTRACT

A multiple fiber positioner (MFP) provides a micromachined structure that includes multiple V-grooves in silicon created via anisotropic etching for positioning optical fibers in splices and connectors. The MFP has a permanently bonded cover to provide a one-piece, stand-alone component. This MFP component is used to create new fiber optic splices and connectors.

20 Claims, 23 Drawing Sheets

MULTIPLE FIBER POSITIONER FOR OPTICAL FIBER CONNECTION

BACKGROUND OF THE INVENTION

1. Field of the Invention

The present invention relates to the field of fiber optics and, more specifically, to the field of fiber optic connectors.

2. Description of Prior Art

Fiber optic connector systems provide the means so that light can propagate through separable connections. To accomplish this, the connector system must align, hold and retain the optical fibers. For example, fiber optic connectors interconnect segments of fiber or connect fiber to active or passive devices. A fiber optic connector must control and minimize the loss of light energy as measured by the dB insertion loss. Many applications require insertion losses to be no more than in the range of about 1 dB. This requirement forces very stringent tolerances on the mechanical components of the connector system.

The prior art shows many connector designs. These include V-groove, three-rod containment, resilient ferrule, elastomeric bushing, jewel bushing, conical nose/conical adapter, and precision ferrule/precision adapter devices. In the ferrule types of connectors, a ferrule terminates the end of each optical fiber. For example, U.S. Pat. No. 4,645,296 discloses a resilient ferrule connector. U.S. Pat. No. 4,934,785 discloses a precision ferrule connector.

Currently, the major commercial connectors employ ferrules. These include the SMA, ST, SC and FC connectors where each ferrule is a right cylinder. These also include the Biconic connector where the ferrule is a truncated cone. Ferrule-terminated fibers require an alignment means to provide precise positioning of the fiber ends. In one design, an elastomeric sleeve aligns the front portions, termini, of the mating ferrules. In another design, a split spring sleeve aligns oppositely facing ferrules. In these designs, the ferrule diameter is slightly larger than the free-standing diameter of the alignment means. This insures interference for the precise alignment of the two mating ferrules. In yet another design, a precise bore provides a cylindrical channel for alignment. U.S. Pat. No. 5,179,607 provides additional teachings on the means and methods to align cylindrical ferrules with adapters.

As taught in U.S. Pat. No. 5,080,461, most optical fiber connections are constructed by embedding the fiber ends in a cylindrical ferrule, polishing the fiber ends, and inserting the prepared ends into an alignment adapter, which optically and mechanically mates the fiber ends along a common axis. The connector ends may be attached to the alignment adapter by, for example, threaded or bayonet-type nuts.

These prior art connectors provide viable means to interconnect individual optical fibers for single-channel circuits. Prior efforts to extend these single-channel connectors to gang or array connections have met with numerous problems. The resulting multiple channel connectors have not enjoyed great commercial success because of their difficult assembly requirements and high cost. Prior efforts have included both gang-type connectors and V-groove fiber connector. The gang-type connectors employ the concept of housing multiple independent cylindrical ferrules within a common frame. The V-groove connector uses a V-groove structure to simultaneously secure multiple optical fibers within a single positioning structure.

U.S. Pat. No. 4,973,126 discloses that grooved, rigid members such as wafers or blocks are useful for supporting and aligning optical fibers. For example, U.S. Pat. No. 3,864,018 describes silicon wafers having multiple, parallel, V-shaped grooves formed in their upper and lower surfaces by crystallographic etching. In this patent, block-like structures having arrayed, parallel channels are created by stacking the wafers such that upper-surface grooves meet corresponding lower-surface grooves. Multiple optical fibers are aligned and potted in the channels to create an alignment block. A face of the block can be sawed along a plane perpendicular to the fibers, and subsequently polished, to make a mass fiber end-connector.

Also as disclosed in U.S. Pat. No. 4,973,126, developers have used members having V-grooves to align the end portions of optical fibers in optical fiber connectors that are simple enough for field installation. One general category of such connectors makes use of a block or base member having a V-groove in its upper surface, into which the fiber end-portions are placed, and clamps for pushing down on the fiber portions to hold them in the groove. However, those connectors that have been proposed are expensive to manufacture because they involve complicated parts, or expensive materials in significant quantities, or relatively inexpensive materials together with stringent manufacturing standards. As summarized in U.S. Pat. No. 4,973,126, "Thus, practitioners in the field have only been partially successful in the search for a field-installable optical connector that is simple to use, economical to manufacture, and that is able to align pairs of fibers with high precision".

SUMMARY OF THE INVENTION

Briefly stated, the invention provides a one-piece multiple fiber positioner (MFP) for fiber optic connectors. In addition, the invention teaches how to employ this MFP to create improved and more useful fiber optic splices and connectors.

This MFP is economical to manufacture, easy to connect and disconnect and highly reliable in operation. Micromachining techniques adapted from integrated circuit production have been used to produce MFPs. In one preferred embodiment, the MFP has a clear glass cover bonded permanently to an anisotropically etched silicon base. The anisotropic etching of the silicon provides the required fiber positioning V-grooves with tolerances of a few micrometers.

The channels defined by the etched V-groove surfaces in the silicon and the interior surface of the glass cover provide very precise control of dimensions and tolerances. With appropriate processing, these channels can provide smooth surfaces for locating and positioning the optical fibers. These MFPs can be provided with lead-in chamfers at the ends of the V-groove channels. These lead-in chamfers facilitate threading optical fibers into the V-groove channels by providing "funnels" to get each fiber started into its channel. In addition, chamfer structures have been demonstrated within the V-groove channels to reduce the clearance between the fiber surface and the V-groove positioning surfaces.

In one preferred embodiment, the glass cover of the MFP is clear. The clear glass allows visual inspection of the V-groove channels and the fibers within the MFP. During assembly, optical fibers are inserted through the entire MFP with their ends protruding from the front face, then bonded in place and finally cleaved and polished.

The invention provides a multiple fiber mechanical splice for simultaneous mechanical joining of optical fibers in cable. This splice uses the MFP to secure and precisely position the mating pairs of individual optical fibers to achieve excellent light throughput characteristics.

In addition, the invention provides multiple-fiber connectors. These connectors use pairs of the MFP to secure and precisely position multiple mating pairs of individual optical fibers to achieve excellent light throughput characteristics.

BRIEF DESCRIPTION OF THE DRAWINGS

The invention will be more fully understood and further advantages will become apparent when reference is made to the following detailed descriptions of the preferred embodiments of the invention and the accompanying drawing in which.

DETAILED DESCRIPTION OF THE PREFERRED EMBODIMENTS

Figure 1:
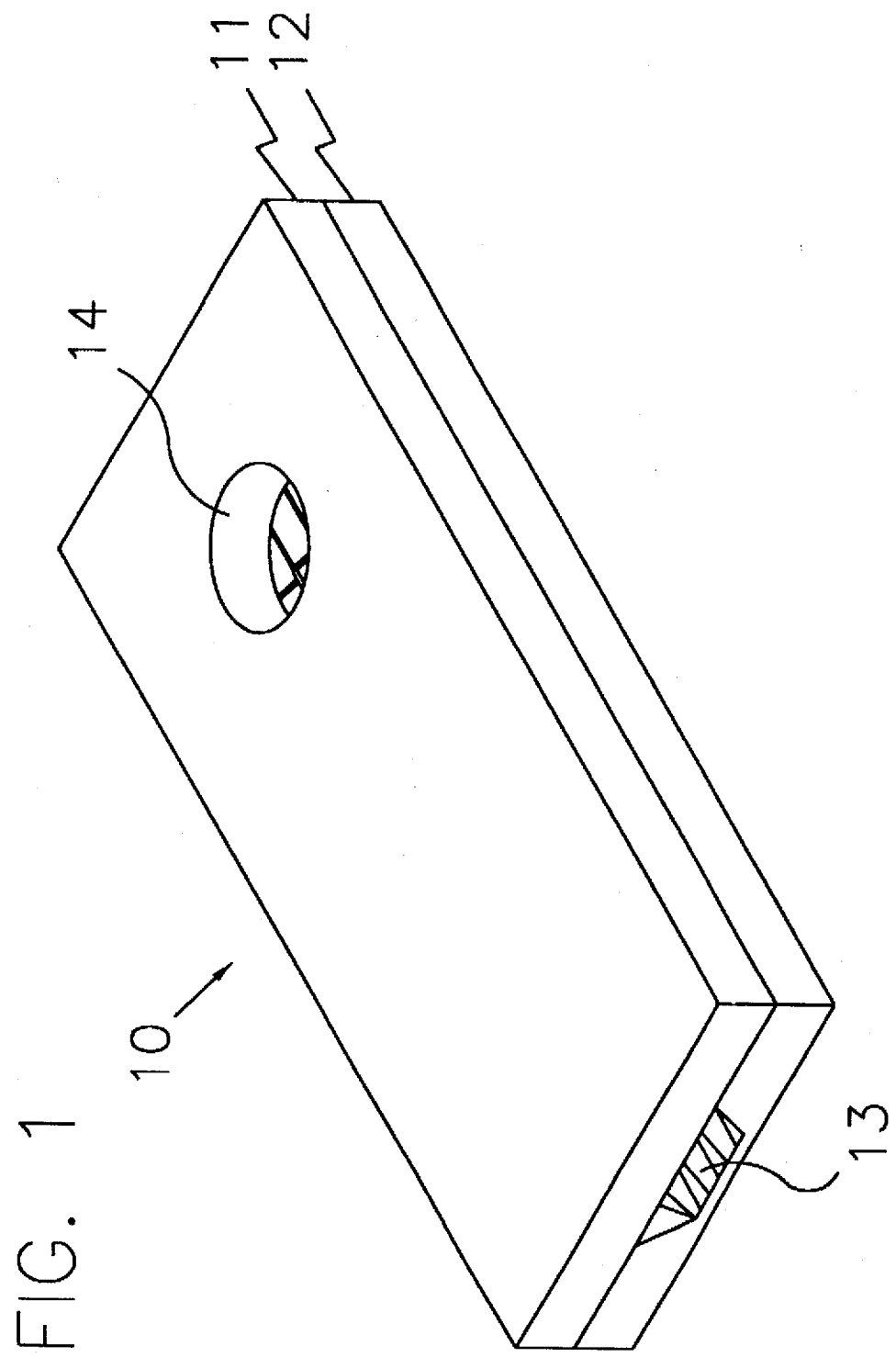
FIG. 1 provides an isometric view of one version of an MFP.

Turning now to the drawings, wherein like reference numerals designate like elements throughout, FIG. 1 presents an isometric view of one version of a multiple fiber positioner (MFP) 10. The MFP 10 has a cover 11 bonded permanently to an anisotropically etched silicon base 12. The anisotropic etching of the silicon 12 provides the required fiber positioning V-grooves and lead-in chamfers "funnels", shown generally at 13. The cover 11 includes a hole 14 which provides access to a portion of each V-groove through the cover. MFPs with different outside dimensions can be designed and constructed; in one preferred embodiment, the overall dimensions were 10 millimeters long by 4.4 millimeters wide by 1.3 millimeters thick. The base 12 is fabricated using a silicon wafer. The cover 11 is fabricated using a wafer in one of various materials including silicon or glass; covers fabricated from clear glass provide the benefit of allowing visual inspection of the V-groove channels.

Figure 2:
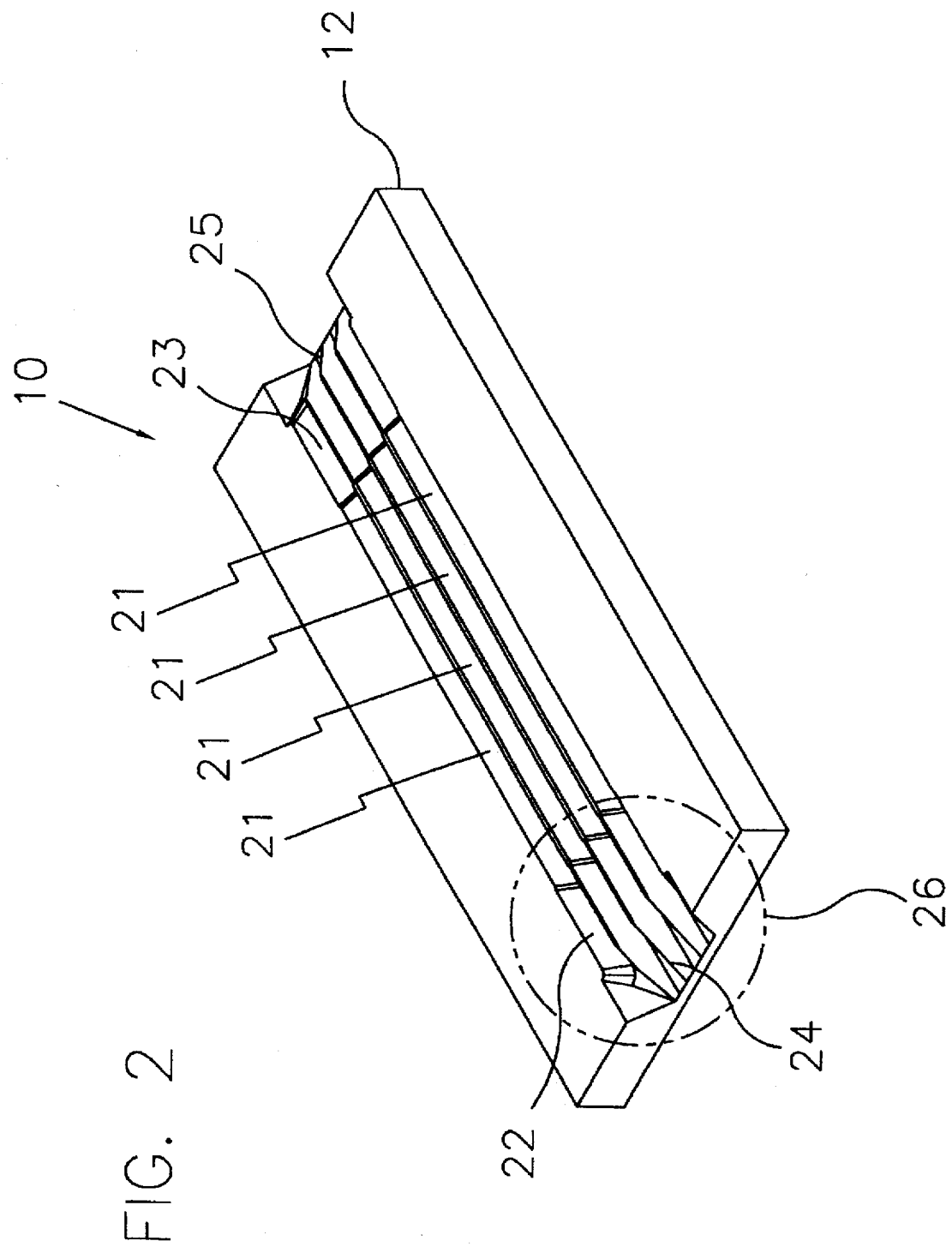
FIG. 2 shows an isometric view of the silicon base with the cover cut away.
Figure 3:
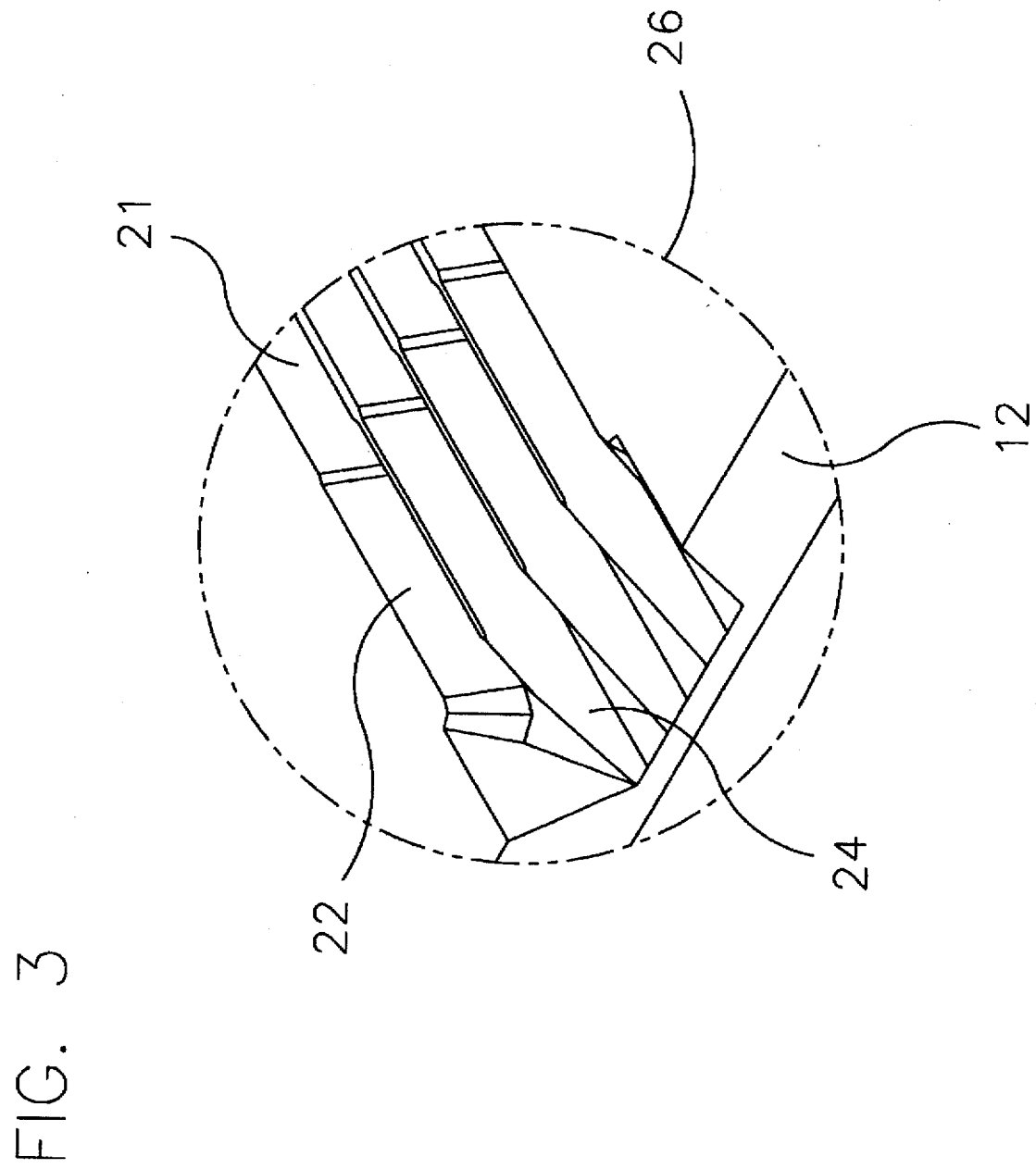
FIG. 3 presents an enlarged detail from the isometric view of FIG. 2.

FIG. 2 is an isometric view of the silicon base 12 with the cover 11 cut away. This Figure provides a clearer view of the features that are etched into the silicon base 12. The V-groove channels 21 locate and position the optical fibers. As shown, this MFP 10 has four V-groove channels 21; more or fewer channels can be provided with alternate designs. These V-groove channels 21 can be created with different widths to accommodate different size fibers. As shown, the V-grooves 21 are sized for 170 micrometer fiber; V-grooves have also been etched for 125 micrometer and 140 micrometer fiber. With minor modifications in the design, both smaller and larger diameter optical fiber could be accommodated. The V-grooves 21 in the vicinity of 22 and 23 have been slightly widened to facilitate the insertion of the optical fiber into the V-groove (with cover attached). The ends of the V-grooves 21 have been provided with lead-in chamfers 24 and 25. These lead-in chamfers 24, 25 facilitate hand threading of optical fibers into the V-grooves 21 by providing "funnels" to get each fiber started into its channel. To provide a clearer view of the funnels 24 and chamfered "step-down" in the V-groove width, FIG. 3 provides an enlarged detail view of region 26.

The MFPs 10 of the present invention are produced using micromachining techniques adapted from the semiconductor industry. MFPs 10 were fabricated from two separate wafers that included the segments 11, 12 that were processed independently, then bonded, and finally diced into many components similar to the MFP shown in FIG. 1. To accomplish this bonding, the methods of anodic bonding were used; these techniques are well-known to those skilled in the art of micromachining. To produce prototypes for test, 4 inch wafers were used; one wafer was silicon and the other was glass; larger or smaller wafers could be used.

Silicon wafers that included the segment 12 were etched to create triangular shape V-grooves 21. The V-grooves 21 were created in the silicon because certain etching solutions have the ability to preferentially etch one crystallographic plane much faster than the others. Such anisotropic etching chemical solutions include hydrazine with deionized water, potassium hydroxide with deionized water, potassium hydroxide with alcohol and deionized water, ethylenediamine pyrocatechol and deionized water, tetramethyl ammonium hydroxide and deionized water, as well as others, as is well-known in the art of anisotropically etching silicon.

The starting material was a single crystal silicon wafer that included the segment 12 with (100) orientation and a (110) flat. Using previously developed photolithographic techniques, very precise patterns were created in photoresist materials on the surface of the silicon wafer. Following established techniques, the photoresist material was processed to create a very precise etching mask on the silicon surface.

To create V-grooves 21, the etching mask contained open parallel bands that were parallel to the (110) flat. When subjected to the etching solutions, these open bands had material removed from the (100) plane to create a groove whose sidewalls were (111) planes. Because these (111) planes etch at a much slower rate, a trapezoidal groove was created. By allowing the etching to continue, the (100) plane disappears to create a triangular shaped V-groove 21 with (111) planes as sidewalls. The angle between the (111) plane and the (100) plane was 54.7 degrees. As discussed earlier, these grooves 21 with these angles formed precise channels to hold and position the optical fibers.

To create the funnels 24, 25, the etching mask provided portions on the open parallel bands that were wider than the open parallel bands described above. These wider regions created deeper and wider V-grooves. These wider regions were typically a few millimeters long. In one preferred embodiment, the width was great enough to actually break into the adjoining V-groove. In addition, the corners on the etching mask between the narrower and wider bands resulted in corners on the silicon wafer that were attacked more aggressively by the etching solutions. As is known to those skilled in the art of silicon micromachining, these corners allowed the etching solutions to produce the "fast-etching planes". These fast-etching planes provided the chamfered surfaces for the funnels 24, 25.

The glass wafer that included the segments 11 was processed to cut the hole 14 through the entire thickness. Following processing, the two wafer that included the segments 11 and 12 were bonded together. This bonding was accomplished by using the techniques of anodic bonding. Then the bonded structure was diced into its individual pieces. One bonded structure provides many MFPs.

Again, it must be emphasized that the cover 11 is permanently bonded to the silicon base 12 before the optical fiber is inserted. This creation of a one-piece multiple fiber positioner which can receive fibers into triangular openings is an important aspect of this invention. The prior art approach placed the optical fibers into longitudinal grooves in the silicon (or other material) and then placed a separate cover over the assembly. This prior art approach made the termination of optical fibers sufficiently difficult as to require laboratory conditions and to essentially preclude field termination of optical cables. The MFP 10 of the present invention overcomes these earlier difficulties. The optical fibers are simply slid into the funnels 24 at the end of the MFP 10 and pushed through the full length of the V-groove 21 in the MFP. This operation has proven to be sufficiently easy to allow for insertion by unaided hand with unaided vision.

Figure 4:
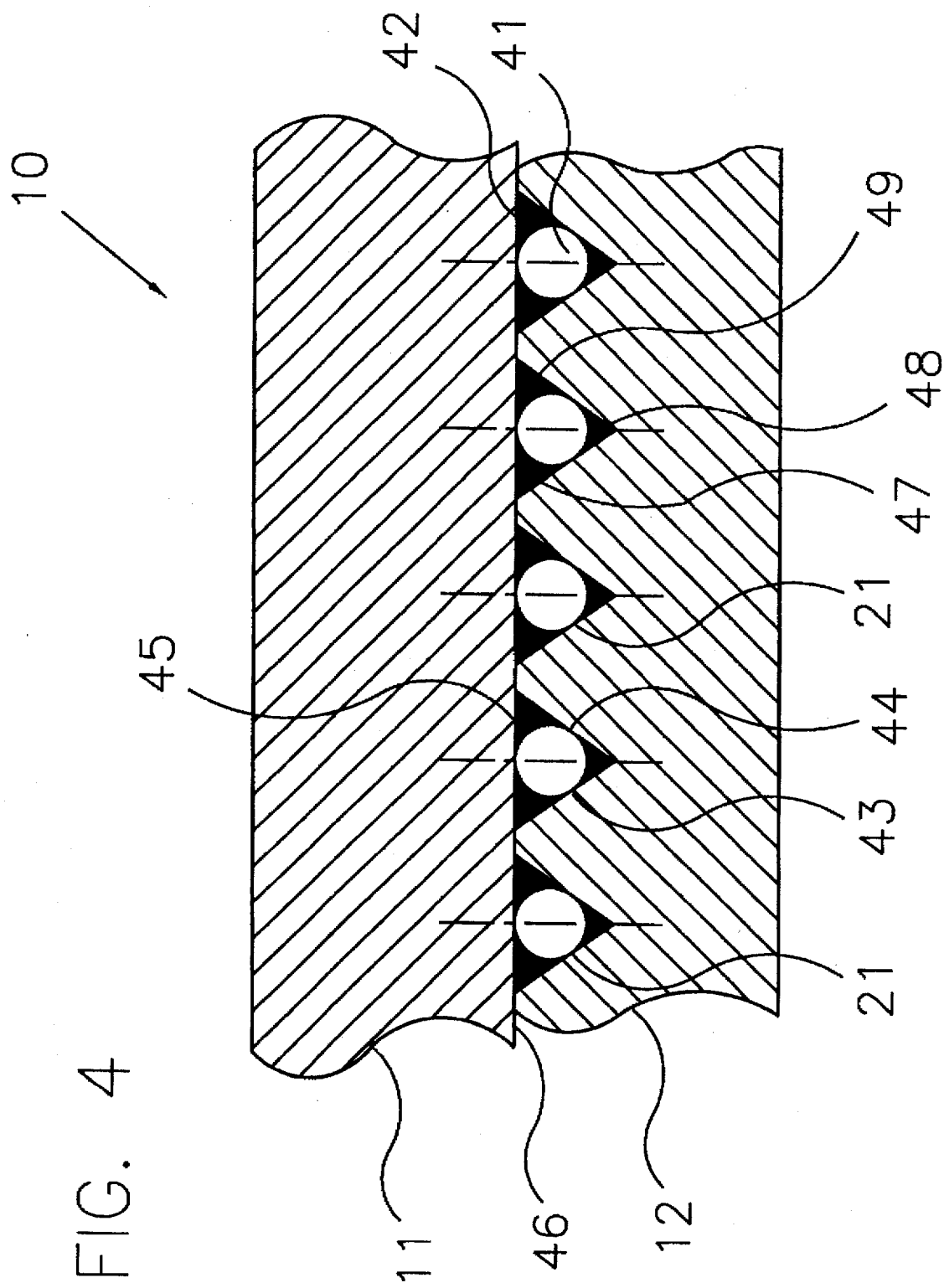
FIG. 4 gives a cross sectional view of the optical fibers after insertion into the MFP.

After insertion, the optical fibers are positioned by two etched surfaces in the silicon 12 and by the flat surface of the permanently attached cover 11. FIG. 4 provides a cross-sectional view of the optical fibers after insertion into the MFP 10. This illustration shows five fibers 41 located in the triangular V-grooves 42 created by the permanently attached cover 11 and the silicon base 12. More specifically, each fiber is positioned by two etched surfaces 43, 44 in the silicon base 12 and by the flat inside surface 45 of the cover 11. Note that the fiber 41 resides completely within the V-groove 21 provided by the silicon base 12. None of the fiber 41 protrudes beyond the joining plane 46 into the cover 11. This is markedly different and superior to many of the prior art approaches where grooves were provided on both sides of the "joining plane". With the present invention, the alignment of the cover 11 is dramatically less critical; lateral misalignments of the cover relative to the base 12 do not adversely affect the positioning of the fibers 41 in the V-grooves 21. If desired, the fibers 41 can be permanently bonded within the MFP 10 by inserting epoxy or other adhesive into the corner regions 47, 48 and 49 around each fiber. In practice, it has proven to be convenient to introduce epoxy by the use of a pipette or syringe, for example, using the hole 14 shown in FIG. 1.

A variety of different versions of MFPs are envisioned within the scope of this invention. The MFP must provide at least one channel for an optical fiber 41. For some applications, multiple channels, such as four or five, are more desirable. MFPs have been generated with either 4 or 5 separate channels. In other applications, greater numbers of channels may be required. MFPs with 12 channels have been designed. Even greater numbers of optical channels could be accommodated without limit until the MFP became unwieldy to handle with its large attachment of optical fibers. In addition, different versions of MFPs have been designed and constructed to accommodate different optical fiber diameters including 125, 140 and 170 micrometers. Additional designs could be created to handle either smaller or larger diameter fibers.

Figure 5:
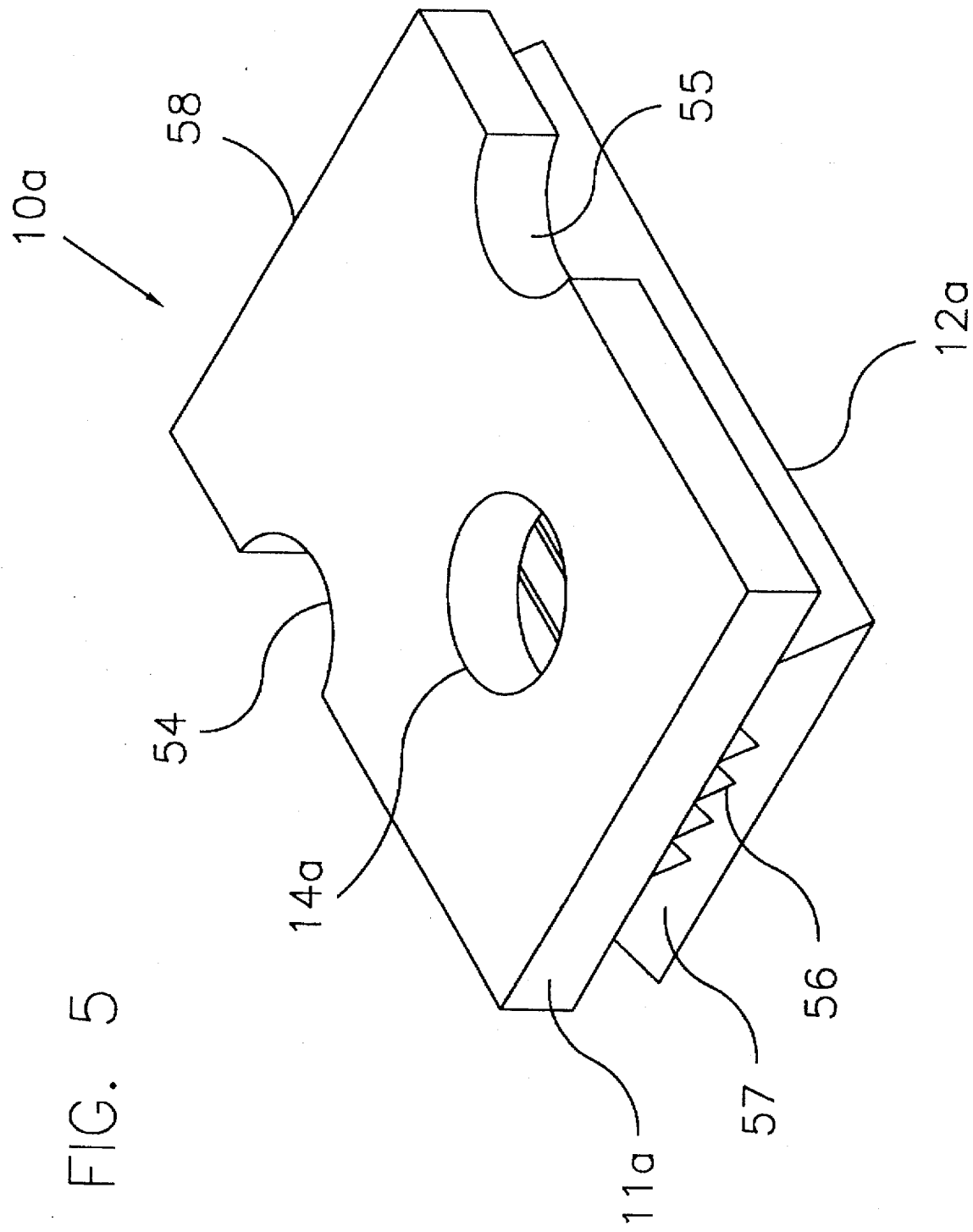
FIG. 5 provides an isometric view of an MFP customized for use in a separable connector.
Figure 6:
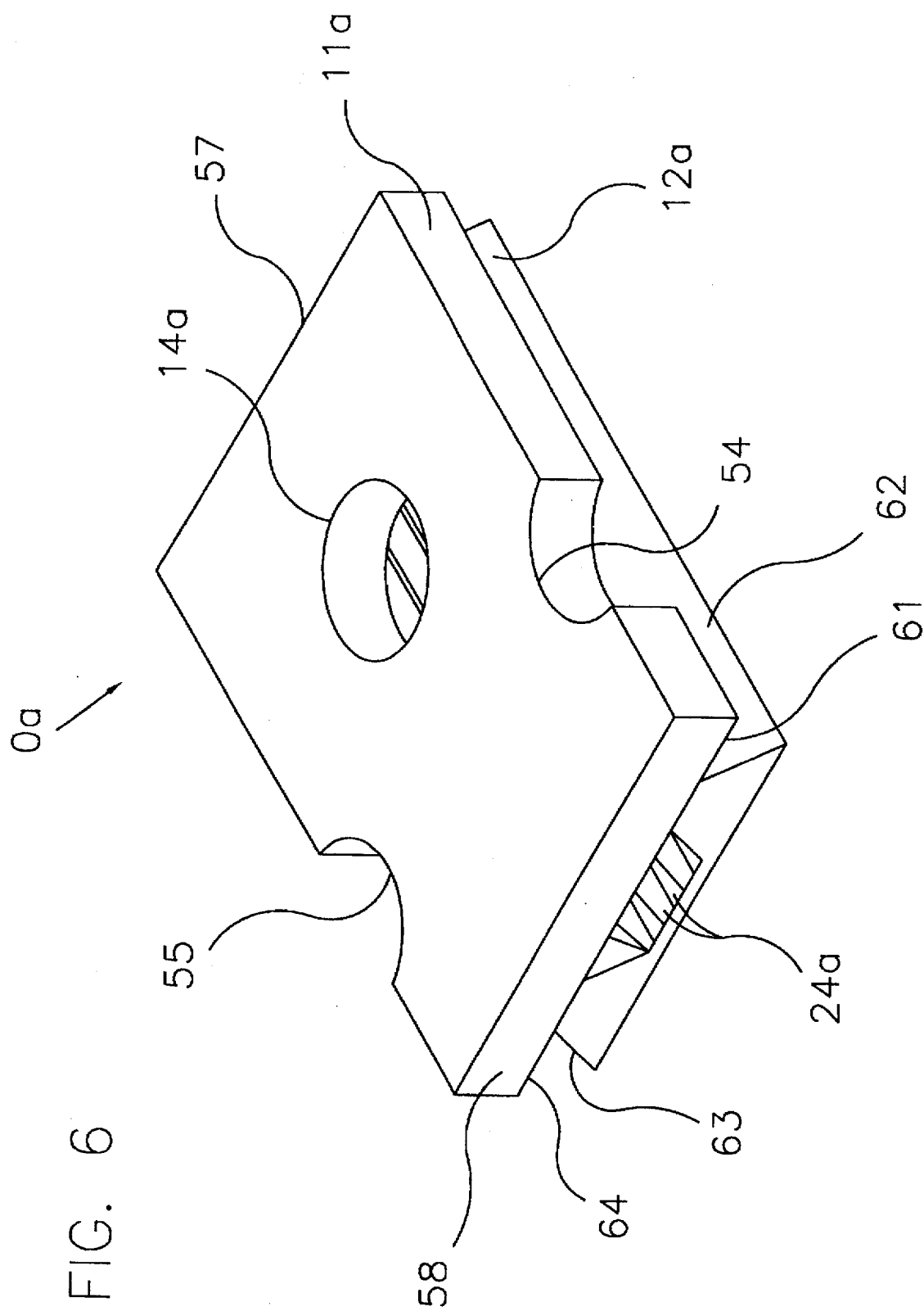
FIG. 6 provides an opposite end isometric view of the same MFP as shown in FIG. 5.
Figure 7:
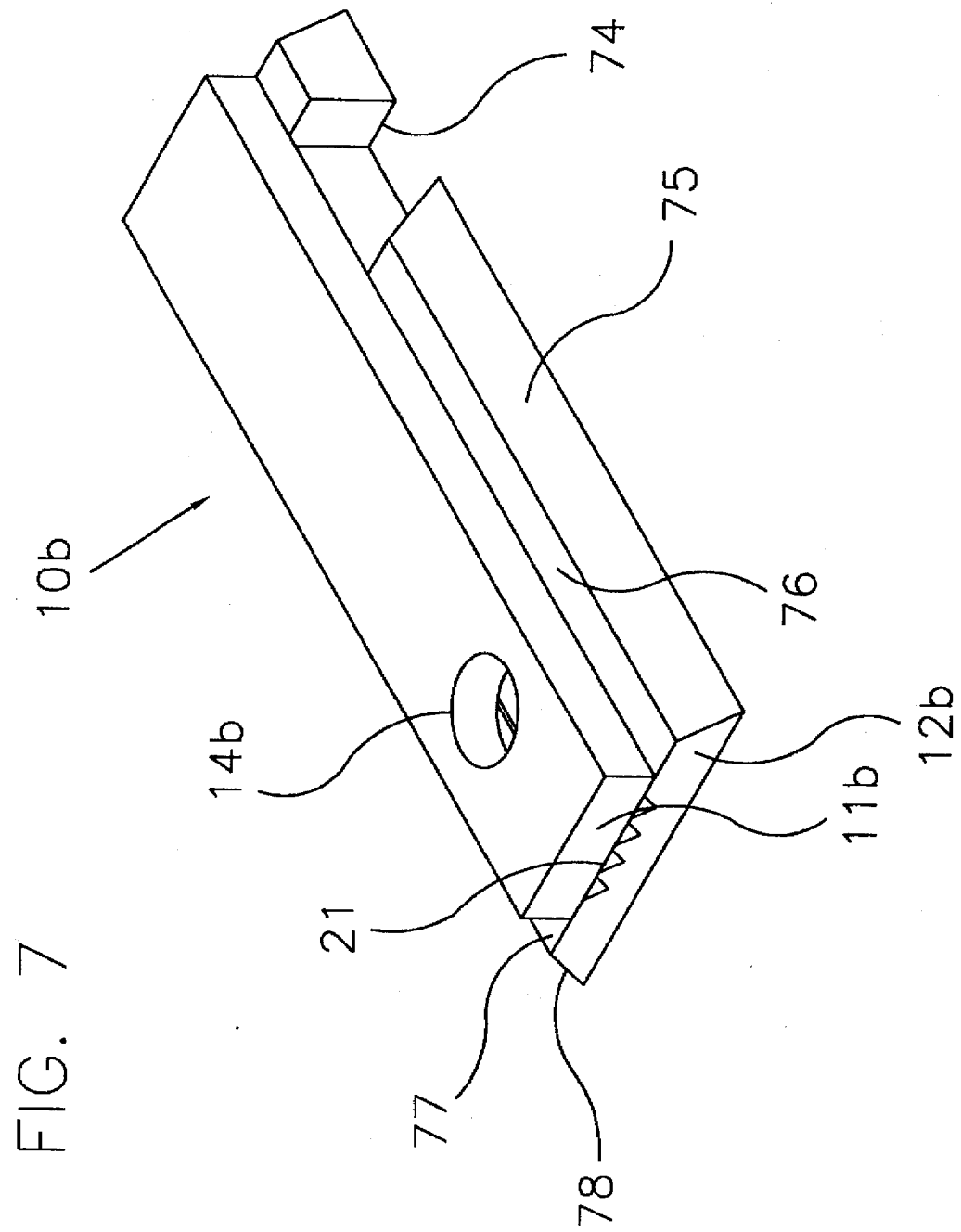
FIG. 7 provides an isometric view of a different version of an MFP customized for use in a separable connector.

In addition, the outside sizes and shapes of MFPs can be customized to facilitate their use in different applications. For example, for use in a splice, the MFP 10 shown in FIG. 1 would be very desirable because it has lead-in funnels 24, 25 at both ends and because the exterior is very "box-like"; more discussion of splice MFPs will follow later. On the other hand, for use in separable connectors, different exterior shapes are more desirable. FIGS. 5, 6 and 7 show illustrative examples of MFPs customized for use within separable connectors. For example, these connector MFPs have lead-in funnels at only one end of the MFP; these connector MFPs also include other features to improve their utility as connector building blocks.

FIGS. 5 and 6 provide isometric views of both ends of an MFP 10a customized for use in a separable connector. The cover 11a is permanently bonded to the silicon base 12a. The cover 11a has a through hole 14a and retention notches 54 and 55. The optical fiber is inserted from end 58 which includes lead-in funnels 24a. The mating end face 57 does not have lead-in funnels; rather, the V-grooves 21 extend all the way to the surface to provide optimum alignment for the optical fibers. This connector MFP is fitted with retention notches 54 and 55 to help secure the MFP within each half of the separable connector as the connector halves are repeatedly mated and separated. In this connector MFP, the cover 11a extends beyond the base 12a to create critical alignment surfaces 61, 62, 63, and 64 to help align mating pairs of MFPs with separable connectors. Critical alignment surfaces 62 and 63 are created on the silicon base 12a by the same anisotropic etching process used to create the fiber V-grooves 21; however, these surfaces 62 and 63 are allowed to etch through the entire thickness of the silicon wafer. The critical alignment surfaces 61 and 64 are simply the flat underside of the cover. In one preferred embodiment, the overall dimensions for the MFP 10a shown in FIGS. 5 and 6 were 6 millimeters long by 4.4 millimeters wide by 1.3 millimeters thick. More discussion of the use of connector MFPs will follow later.

FIG. 7 provides an isometric view of a different version of an MFP 10b customized for use in a separable connector. Again, the cover 11b is bonded permanently to a base 12b; the cover contains a through hole 14b. Again, this connector has lead-in funnels (not shown) on only one end; the other end has V-grooves 21 extending to the mating face. In this alternate version, the retention notch 74 and its twin on the other side of the MFP (not shown) are created in the silicon base 12b. Also, in this altered version, the critical alignment surfaces are different than those shown in FIGS. 5 and 6. In this version, the critical alignment surfaces 75, 76, 77, and 78 are all at the periphery of the silicon base 12b. Surfaces 75 and 78 are created on the silicon base 12b by the same anisotropic etching process used to create the fiber V-grooves 21. The cover 11b is significantly narrower than the base 12b to provide shoulders on the silicon which provide the critical alignment surfaces 76 and 77. In one preferred embodiment, the overall dimensions for this MFP 10b shown in FIG. 7 were 10.2 millimeters long by 4.1 millimeters wide by 1.3 millimeters thick. More discussion of the use of connector MFPs will follow later. The foregoing-described MFPs 10, 10a, 10b can be used to create multiple fiber splices. In one embodiment, a 4-channel optical splice was fabricated for use with a ribbon cable carrying four optical fibers each having a polyimide buffer. The MFP was mounted on a flexible polymeric "elevator" and housed within a protective metal shell. The splice and shell design were developed to facilitate user-friendly operation. The shell assembly included a novel method for cable attachment. This splice design should allow practical field use in adverse conditions.

Figure 8:
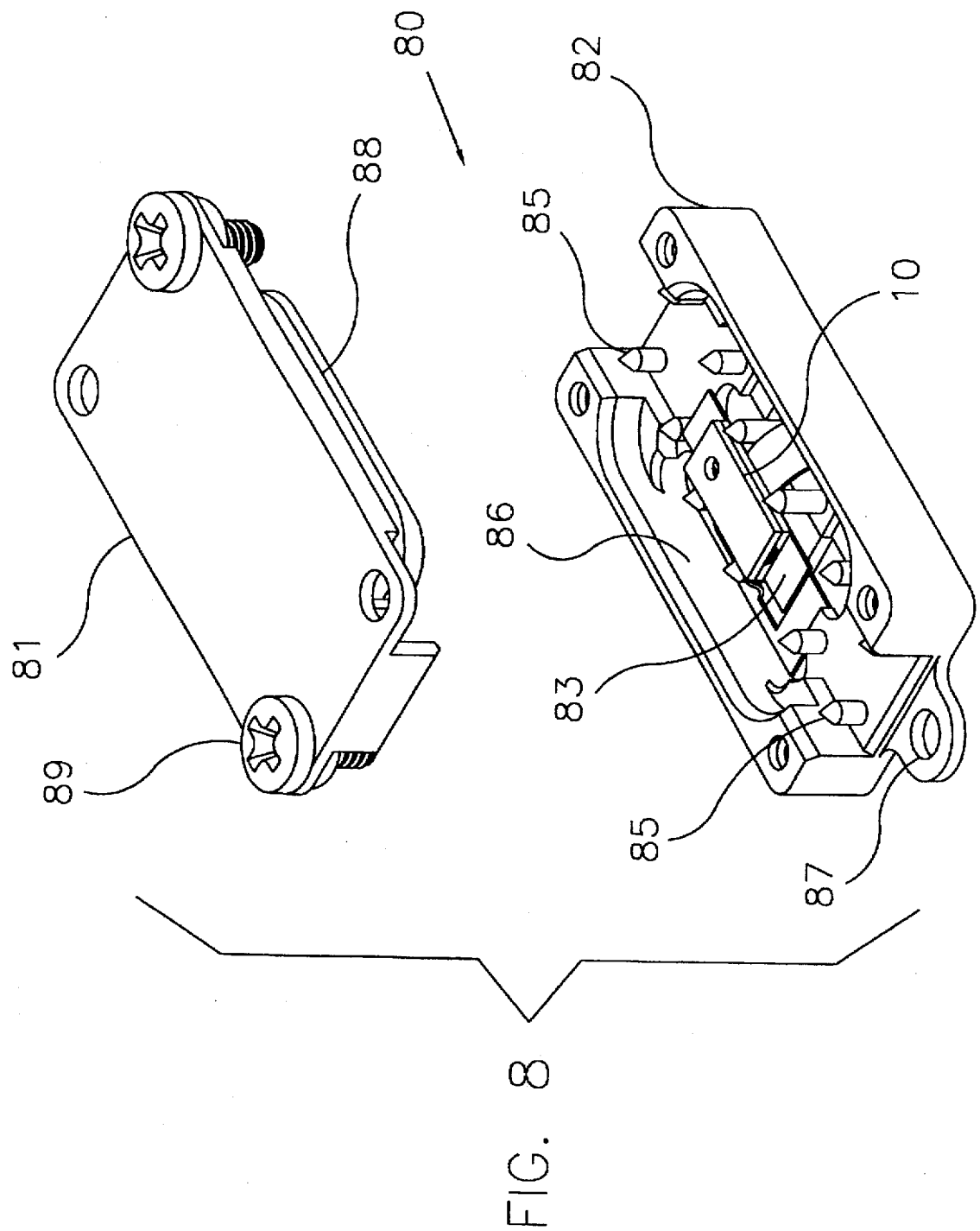
FIG. 8 presents an exploded isometric view of the mechanical splice assembly showing its components.

FIG. 8 presents an exploded isometric view of the mechanical splice assembly 80 showing its components. The overall mechanical splice assembly consists of two halves: an upper splice case 81 and a lower splice case 82. To facilitate user-friendly operation, all the required elements for the total splice would be attached to one of these halves; no additional loose pieces would be required for the splice. The overall splice assembly serves a number of purposes: houses the MFP, shown generically at 10, which provides the alignment means for the mating optical fibers, secures the cables, provides mechanical support, and provides environmental protection. The overall design also attempts to simplify the operations required for splice installation in the field.

The lower splice case 82 provides the following functions.

1. It holds the flexible polymeric film "elevator" 83 which supports the
MFP 10.
2. It provides cable retention posts 85 which penetrate locating holes along the sides of the ribbon cable to both locate and lock the cable within the splice case body.
3. It provides surfaces 86 for an O-ring seal to provide environmental protection,
4. It provides a cable pulling eyelet 87 to help with cable installation.

The upper splice case 81 provides the following functions.

1. It supports an O-ring 88 to provide the seal for environmental protection.
2. It carries retained screws 89 for mechanical connection to the lower splice case.
3. It captures the tops of the cable retention posts to provide additional cable retention strength.
4. It completes the metal shell around the splice for mechanical and environmental protection.

Figure 9:
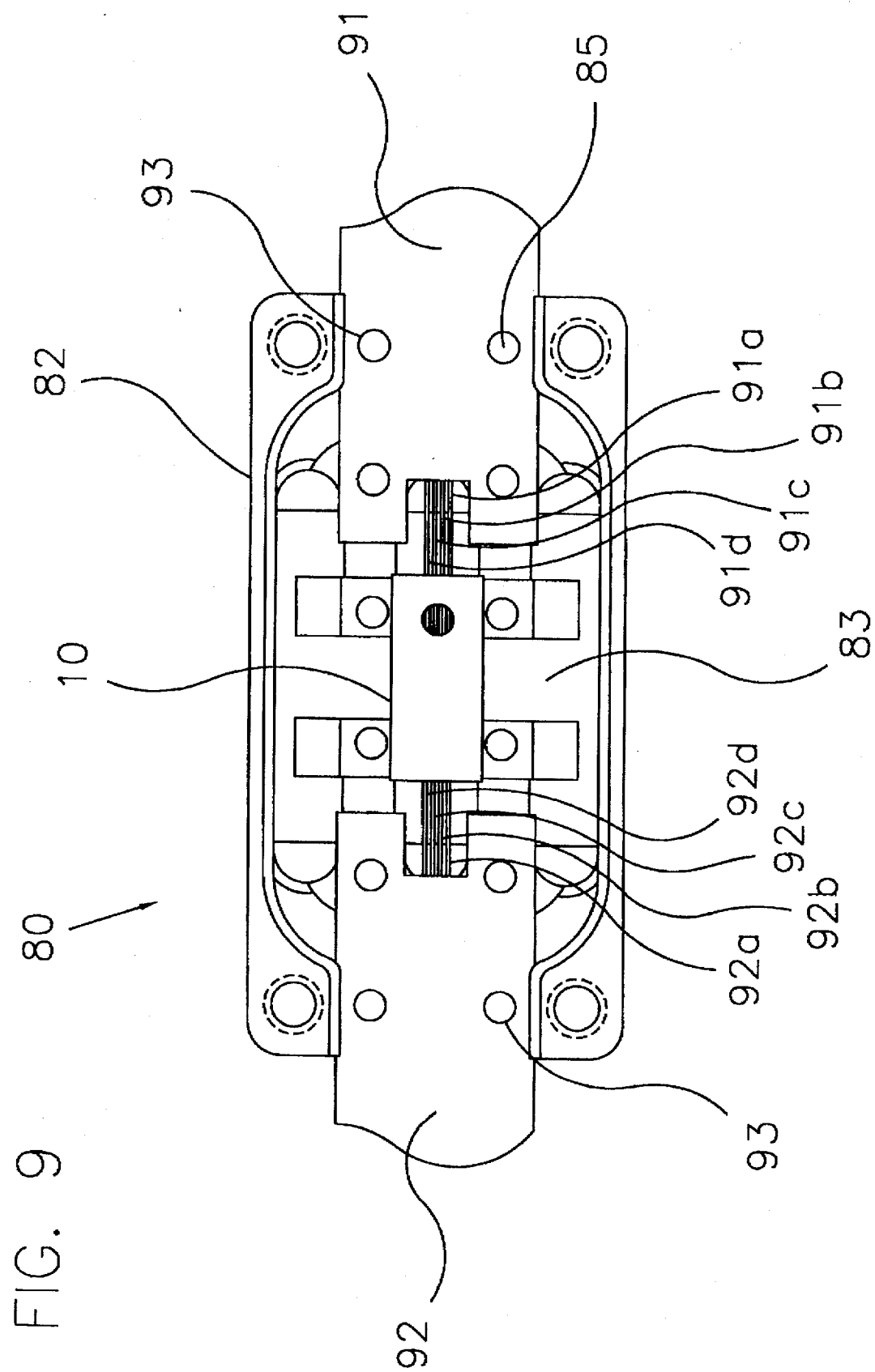
FIG. 9 shows a top view of the optical ribbon cables in the lower splice case.

Turning now to FIG. 9, which is a top plan view of the splice assembly of FIG. 8, the first step in the proposed mechanical splice procedure is the preparation of both cables 91 and 92 at their mating ends. An appropriate length of cable jacket and reinforcement material would be removed from each cable 91 and 92 to expose the individual optical fibers 91a–d and 92a–d with their polyimide buffers intact. Each of the four optical fibers would be cleaved to provide a good optical end-face surface at the appropriate distance from the cable locating holes.

Second, one cable 91 would be mounted to the lower splice case 82. All four fibers 91a–d from one cable 91 are slid into one end of the MFP 10. Following fiber insertion, the cable 91 is secured by pressing it into the lower splice case 82 so that the cable retention posts 85 enter the locating holes 93 along the sides of the cable. FIG. 9 shows a top plan view of the optical ribbon cables 91 and 92 in the lower splice case 82.

Third, the mating cable 92 is mounted to the lower splice case 82 in a similar fashion. All four fibers 92a–d are slid into the opposite end of the MFP 10. Again, the cable 92 is secured by pressing it into the lower splice case 82 so that the cable retention posts 85 enter the locating holes 93 along the sides of the cable.

Finally, the upper splice case 81 is attached and secured by tightening the machine screws 89 until tight. Once tightened, the O-ring 88 provides a complete environmental seal with face seals against the tops of the fiber optic ribbon cables 91, 92 and lateral seals along the case side walls. In one preferred embodiment, when assembled, the overall dimension of the splice case 80 were 37.7 millimeters (42.2 millimeters to the end of the cable pulling eyelet) long by 19 millimeters wide by 8.5 millimeters (10.5 millimeters to the top of the screw head) high.

The MFPs 10, 10a, 10b of the present invention can be used to create multiple fiber separable connectors. In one embodiment, a 4-channel optical bulkhead connector was employed to connect ribbon cables carrying four 100/140/170 micrometer polyimide coated fibers. In this embodiment, the connector is housed in a MIL-C-38999 connector shell size #11 and is designed for use within aircraft. In one of the connector halves, the MFP is mounted within the connector shell using a "floating-contact" concept. The fiber terminus and rear shell designs have been developed to facilitate user-friendly operation. The rear shell includes new methods for cable attachment and seals for environmental protection. The connector design should allow for field installation without elaborate laboratory equipment. The connector is designed to permit non-destructive cable removal.

Figure 10:
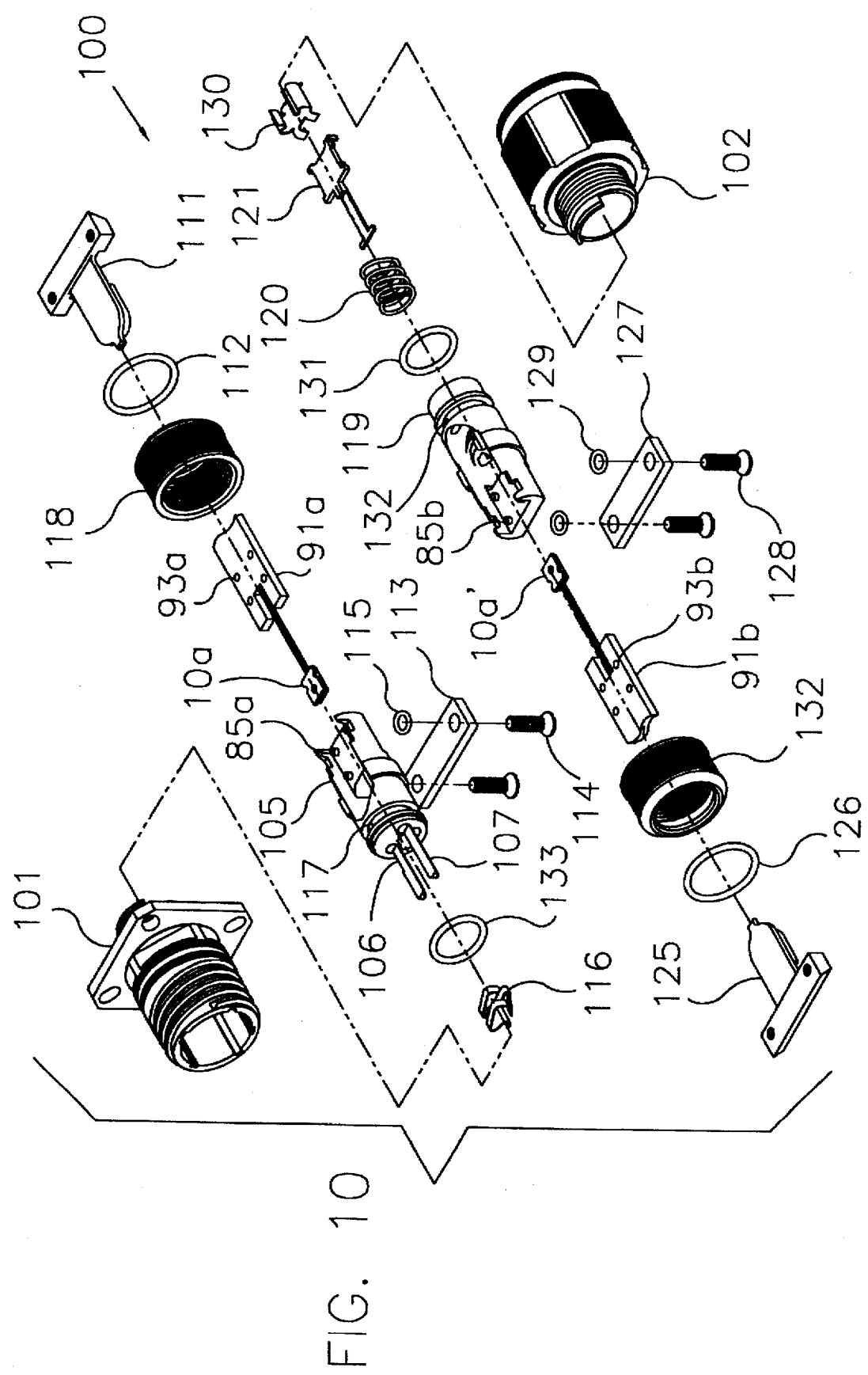
FIG. 10 gives an exploded isometric drawing of a 4-channel bulkhead connector showing both connector halves and their constituent parts.

FIG. 10 is an exploded isometric drawing of a 4-channel bulkhead connector 100 showing both connector halves and their constituent pads. One half of the connector is housed in the MIL-C-38999 receptacle shell 101; the other half is housed in the 38999 plug shell 102. In each connector half, the optical fiber ends are secured and positioned with any of the above-described MFPs 10 or 10'. In this preferred embodiment, MFPs 10a of the type shown earlier in FIGS. 5 and 6 were selected; these MFPs include "critical surfaces" which are used to provide tight tolerance alignment. One MFP 10a is associated with one connector half 101, while the other MFP 10a' is associated with the other connector half 102.

As illustrated in FIG. 10, the receptacle shell 101 receives a number of parts to complete the receptacle half of the connector. The receptacle carriage 105 provides the assembly frame for several parts prior to insertion into the receptacle shell 101. The front of the receptacle carriage 105 has two alignment rails 106 and 107. The ribbon cable 91a is terminated into the MFP 10a; this termination procedure includes preparing the end of the cable, inserting the individual fibers into the MFP 10a, adhering the fibers to the MFP, and cleaving and polishing the end faces of the fibers. The MFP 10a with its attached cable 91a is passed through a passage in the receptacle carriage 105 and then placed over the alignment rails 106 and 107. Cable retention posts 85a in the receptacle carriage 105 enter locating holes 93a along the sides of the ribbon cable 91a to both locate and lock the cable within the receptacle carriage. The carriage cover 111 and its O-ring 112 close the rear portion of the receptacle carriage 109; the carriage cover completes the locking of the ribbon cable 93a and provides part of an environmental seal. The carriage cover 111 is attached to the receptacle carriage 105 with the carriage clamp 113 and the machine screws 114. For convenience, the machine screws 114 are secured to the carriage clamp 113 with the screw retainers 115. The receptacle clip 116 holds the MFP 10a down against the top surfaces of the alignment rails 106 and 107 and also forces one side of the MFP against the side of rail 106; restated, the receptacle clip 116 presses the critical alignment surfaces of the MFP against the receiving surfaces on the alignment rails 106 and 107. The O-ring 133 is placed into an O-ring groove 117 near the front of the receptacle carriage 105. The assembled receptacle carriage is slipped into the back of the receptacle shell 101 and secured with the retaining cap 118.

As shown in FIG. 10, the plug shell 102 receives a number of parts to complete the plug half of the connector. The plug carriage 119 provides the assembly frame for several parts prior to insertion into the plug shell 102 The front of the plug carriage 119 receives the spring 120 and the floating carrier 121. The floating carrier 121 secures itself and the spring 120 to the plug carriage by having its tail captured by an internal ledge in the plug carriage. The ribbon cable 91b is terminated into the MFP 10a'; this termination procedure includes preparing the end of the cable, inserting the individual fibers into the MFP 10a', adhering the fibers to the MFP, and cleaving and polishing the end faces of the fibers. The MFP 10a' with its attached cable 91b is passed through a passage in the plug carriage 119 and then placed into a pocket in the floating carrier 121. Cable retention posts 85b in the plug carriage 119 enter locating holes 93b along the sides of the ribbon cable 91b to both locate and lock the cable within the receptacle carriage. The carriage cover 125 and its O-ring 126 close the rear portion of the plug carriage 119; the carriage cover completes the locking of the ribbon cable 91b and provides part of an environmental seal. The carriage cover 125 is attached to the plug carriage 119 with the carriage clamp 127 and the machine screws 128. For convenience, the machine screws 128 are secured to the carriage clamp 127 with the screw retainers 129. The plug clip 130 holds the MFP 10a' into a pocket in the floating carrier 121; after mating, it also holds the MFP down against the top surfaces of the alignment rails 106 and 107, and forces one side of the MFP against the side of rail 106; restated, the plug clip 130 presses the critical alignment surfaces of the MFP against the receiving surfaces on the alignment rails 106 and 107. The O-ring 131 is placed into an O-ring groove 132 near the front of the plug carriage 119. The assembled plug carriage is slipped into the back of the plug shell 102 and secured with the retaining cap 132.

Figure 11:
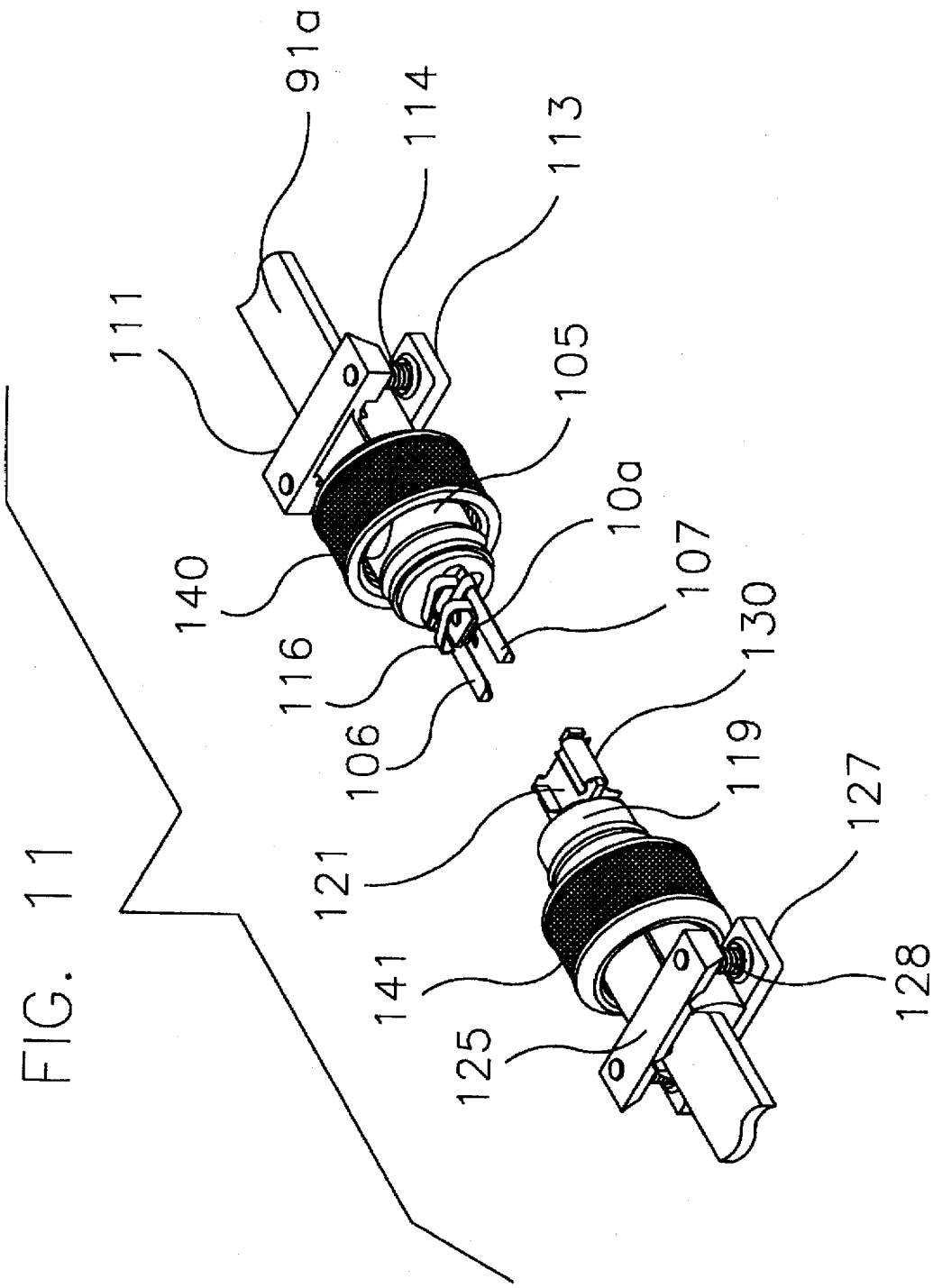
FIG. 11 shows an isometric view of the receptacle carriage assembly and the plug carriage assembly.

FIG. 11 shows an isometric view of the receptacle carriage assembly 140 and the plug carriage assembly 141 prior to insertion into their shells.

With regard to the receptacle carriage assembly 140, the position of the MFP 10a is shown in the receptacle carriage 105 as the receptacle clip 116 holds the MFP against the surfaces of the alignment rails 106, 107. The carriage cover 111 secures the ribbon cable 91a to the receptacle carriage 105 by means of the carriage clamp 113 and the machine screws 114.

With regard to the plug carriage assembly 141, the installation of the floating carrier 121 into the plug carriage 119 is shown, along with the plug clip 130 installed over the floating carrier 121. The carriage cover 125 secures the ribbon cable 91b to the plug carriage 119 by means of the carriage clamp 127 and the machine screws 128.

Figure 12:
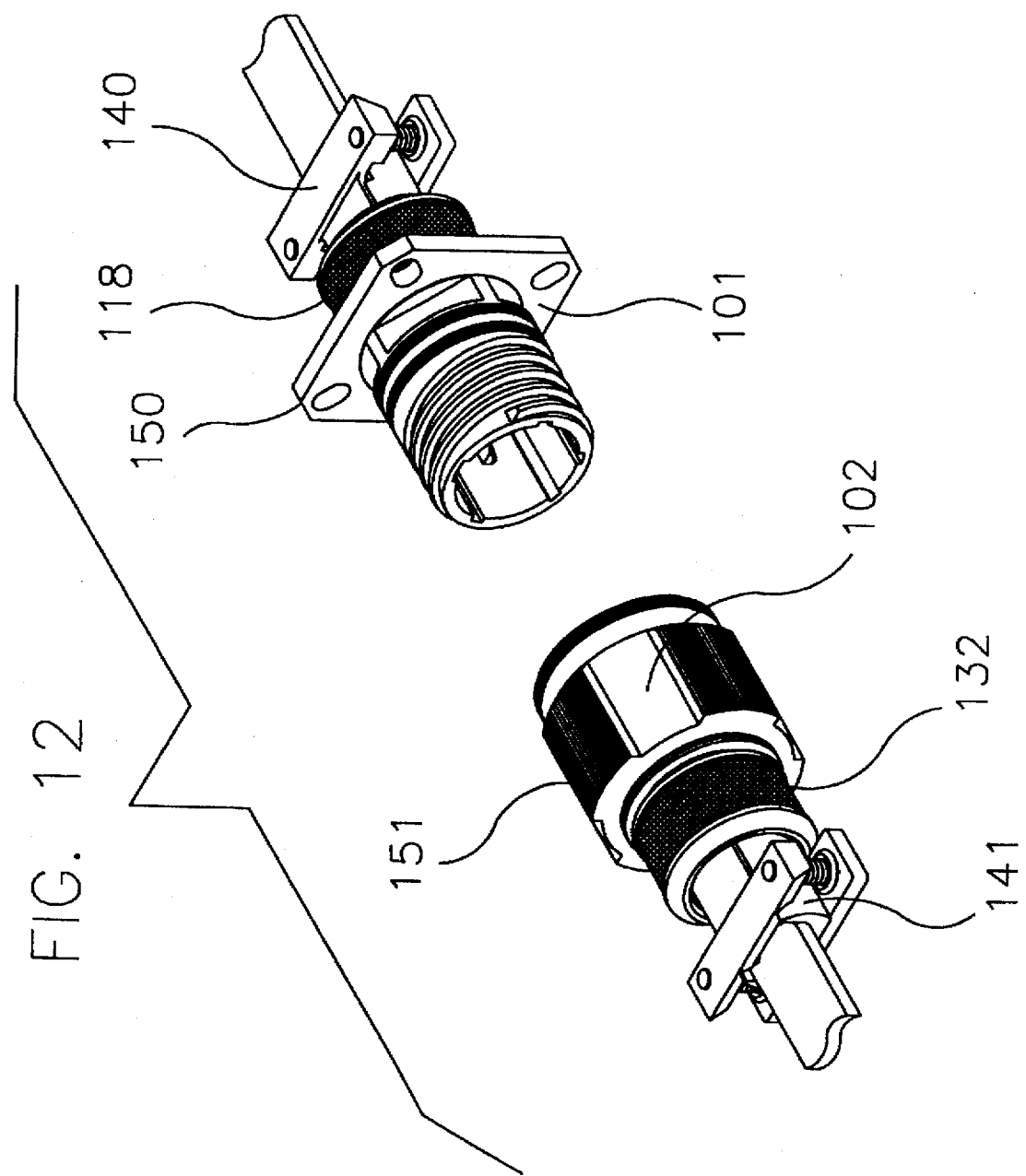
FIG. 12 shows an isometric view of the receptacle assembly and the plug assembly prior to mating of these two connector halves.

FIG. 12 shows an isometric view of the receptacle assembly 150 and the plug assembly 151 prior to mating of these two connector halves.

As seen in FIG. 12, the receptacle assembly 150 comprises the receptacle carriage assembly 140, which is inserted into the receptacle shell 101 and secured with the retaining cap 118. The plug assembly 151 comprises the plug carriage assembly 141, which is inserted into the plug shell 102 and secured with the retaining cap 132.

Figure 13:
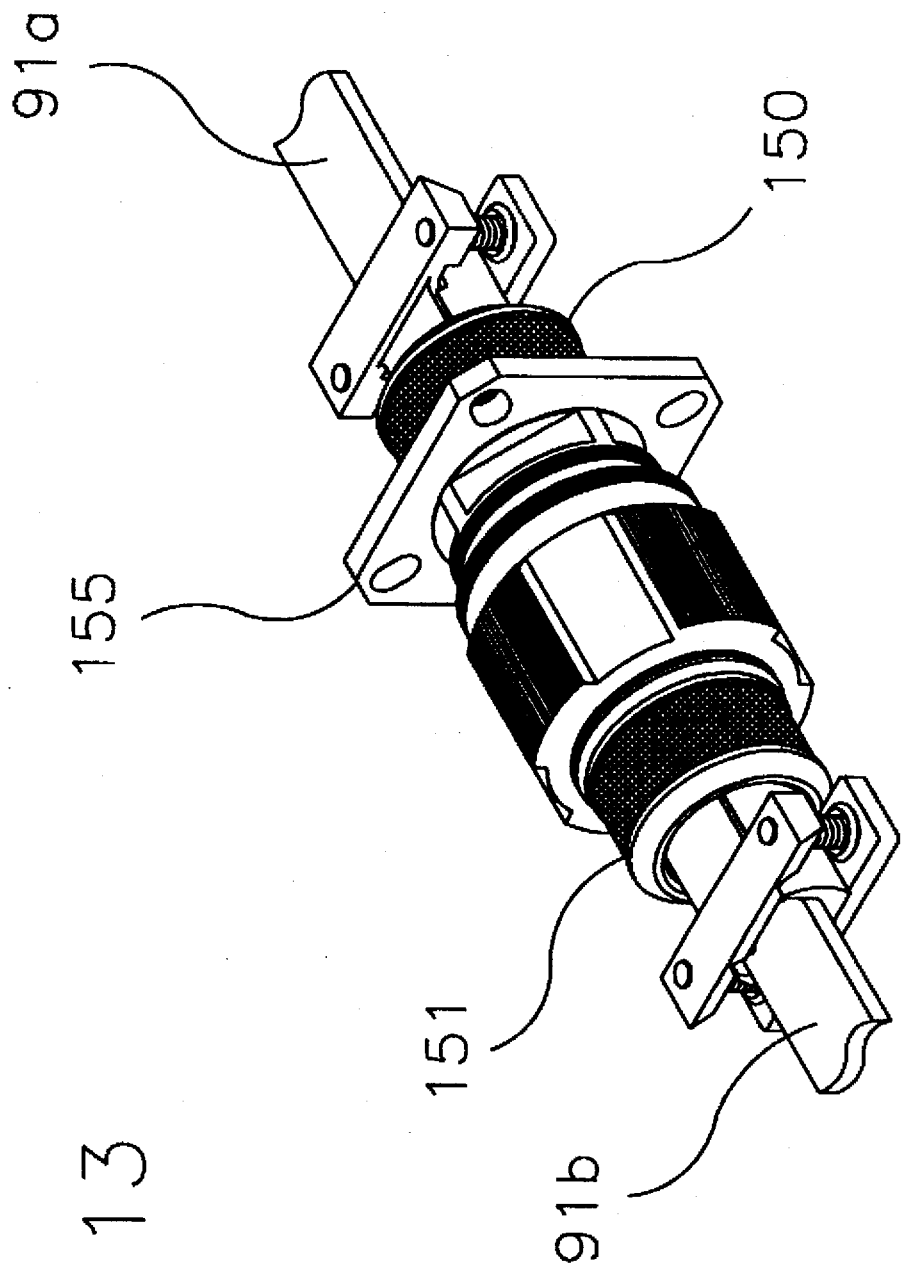
FIG. 13 shows an isometric view of the fully assembled and mated connector.

FIG. 13 shows an isometric view of the fully assembled and mated connector 155. In this view, the bulkhead is not shown to provide fuller views of the connector itself. FIG. 13 shows the plug assembly 151 fully inserted into the receptacle assembly 150. This fully assembled and mated connector 155 provides a separable connection between the fiber optic cables 91a and 91b.

The MFP 10, 10a, 10b of the present invention is spring-loaded within the plug assembly 151. In addition, the MFP 10a' in the plug assembly 151 is allowed to "float" while remaining attached to the floating carrier 121. This float is essential to facilitate blind mating and to accommodate accumulated tolerances in non-critical components. The connector assembly 151, and especially its internal float, is designed to provide a progressive self-alignment mating sequence within the 38999 shell 102. Starting from relatively coarse tolerances on the metal shell pieces 101,102, this progressive self-alignment ultimately leads the MFPs 10a, 10a' to final relative alignment within a couple of micrometers as the connector halves are mated. Stringent alignment tolerances are required to provide the required low optical losses within this butt-coupled fiber optic connector 155.

In a different preferred embodiment, the MFPs 10, 10a, 10b of the present invention were used to design a 16-channel connector housed in a MIL-C-38999 shell size #19. This connector was built on the architecture described above. Each connector half includes four MFPs; each MFP handles four optical fibers. In total, this provides 16 optical channels through the connector. Each MFP terminates its own ribbon cable each containing 4 optical fibers. Each MFP and associated cable can be removed non-destructively from the connector.

Figure 14:
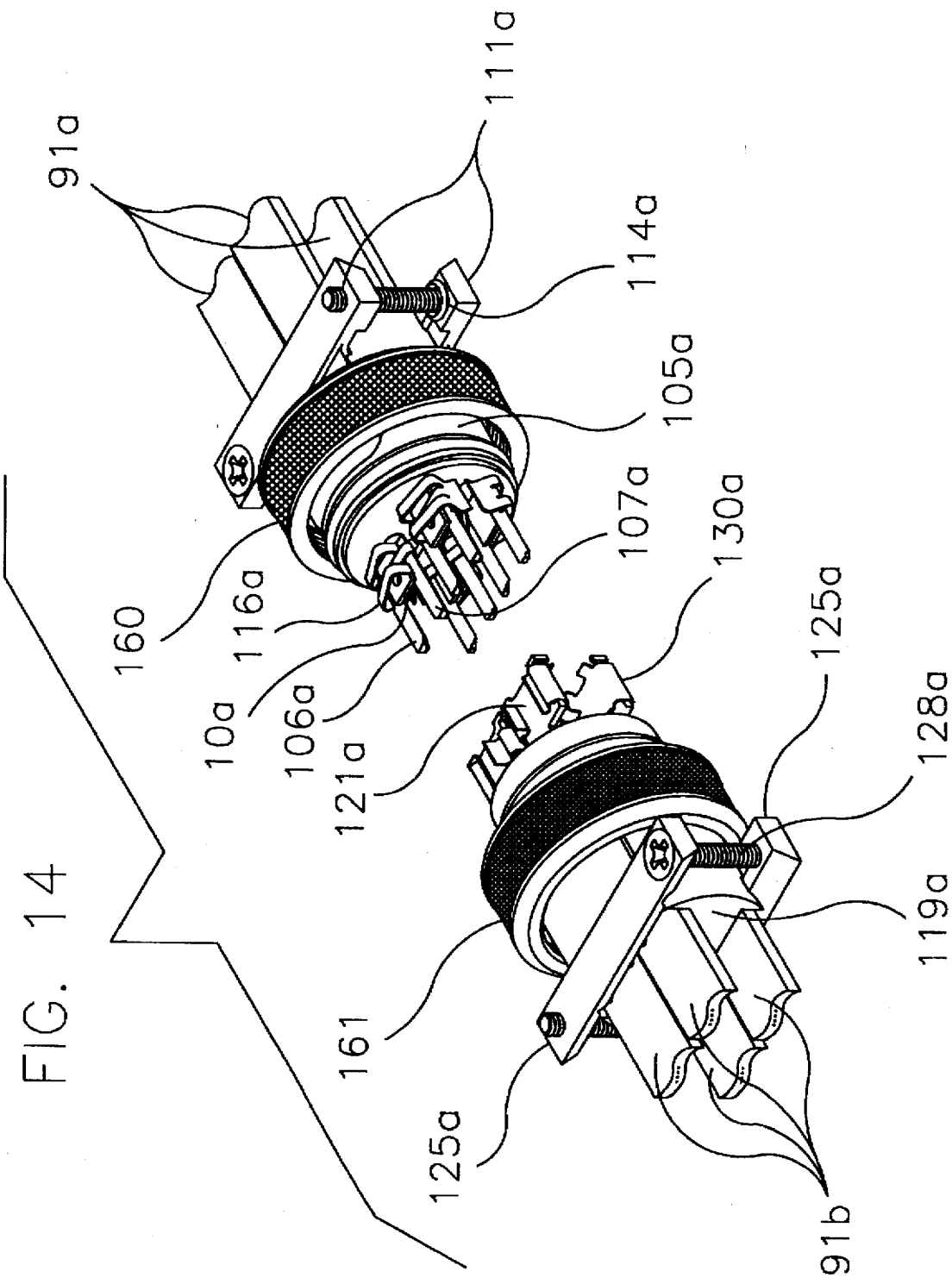
FIG. 14 provides an isometric view of the 16-channel connector showing the receptacle carriage assembly and the plug carriage assembly.

FIG. 14 provides an isometric view of the 16-channel connector showing the receptacle carriage assembly 160 and the plug carriage assembly 161 prior to insertion into their shells.

With regard to the receptacle carriage assembly 160, the position of the four MFPs 10a is shown in the receptacle carriage 105a as the receptacle clips 116a holds each MFP against the surfaces of its alignment rails 106a, 107a. The pair of carriage covers 111a secures the four ribbon cables 91a to the receptacle carriage 105a by means of the machine screws 114a.

With regard to the plug carriage assembly 161, the installation of the four floating carriers 121a into the plug carriage 119a is shown, along with the four plug clips 130a installed over their floating carriers 121a. The pair of carriage covers 127a secures the four ribbon cables 91b to the plug carriage 119a by means of the machine screws 128a.

Figure 15:
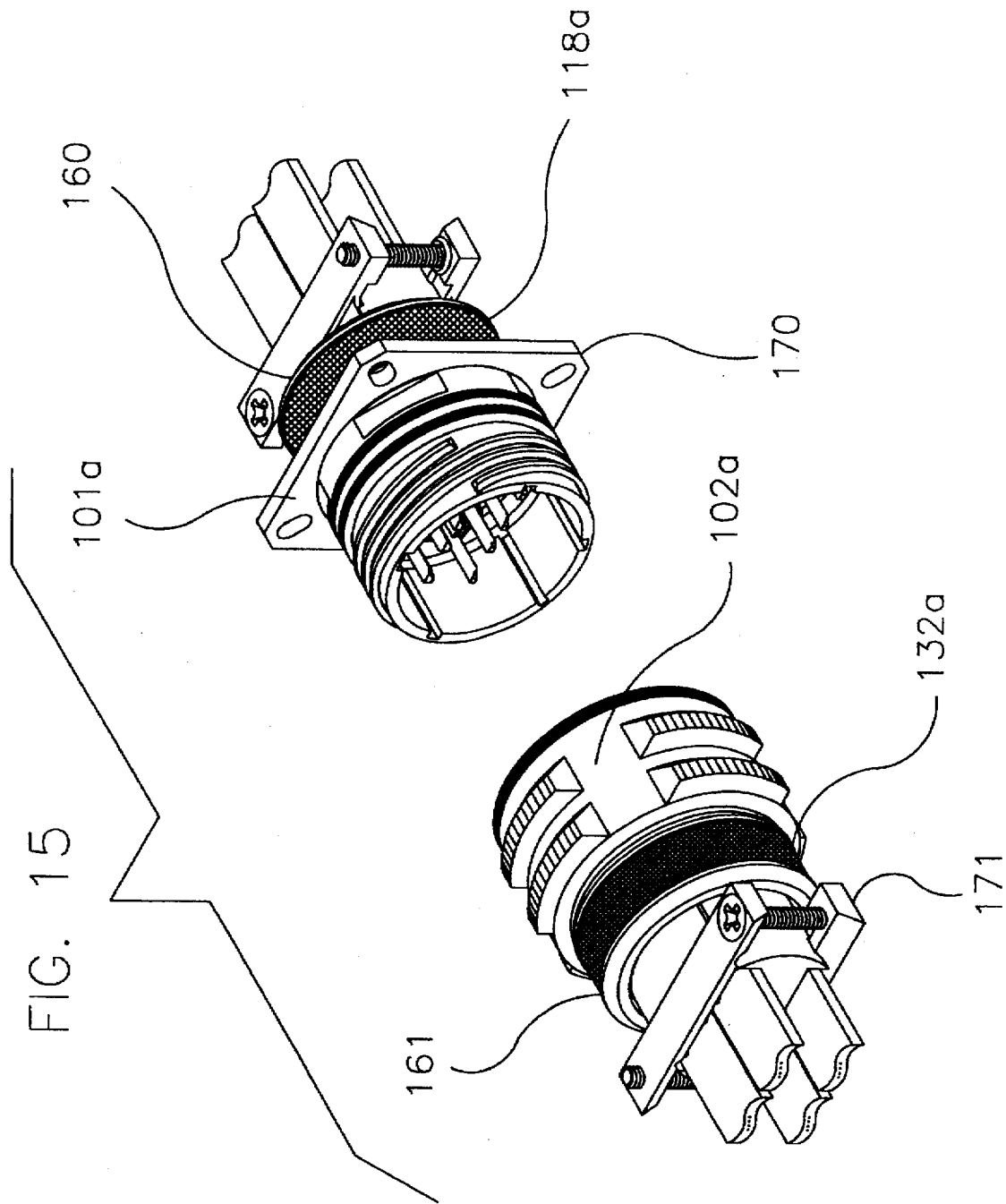
FIG. 15 shows an isometric view of the 16-channel connector showing the receptacle assembly and the plug assembly prior to mating of these two connector halves.

FIG. 15 shows an isometric view of the 16-channel connector showing the receptacle assembly 170 and the plug assembly 171 prior to mating of these two connector halves.

As seen in FIG. 15, the receptacle assembly 170 comprises the receptacle carriage assembly 160, which is inserted into the receptacle shell 101a and secured with the retaining cap 118a. The plug assembly 171 comprises the plug carriage assembly 161, which is inserted into the plug shell 102a and secured with the retaining cap 132a.

Figure 16:
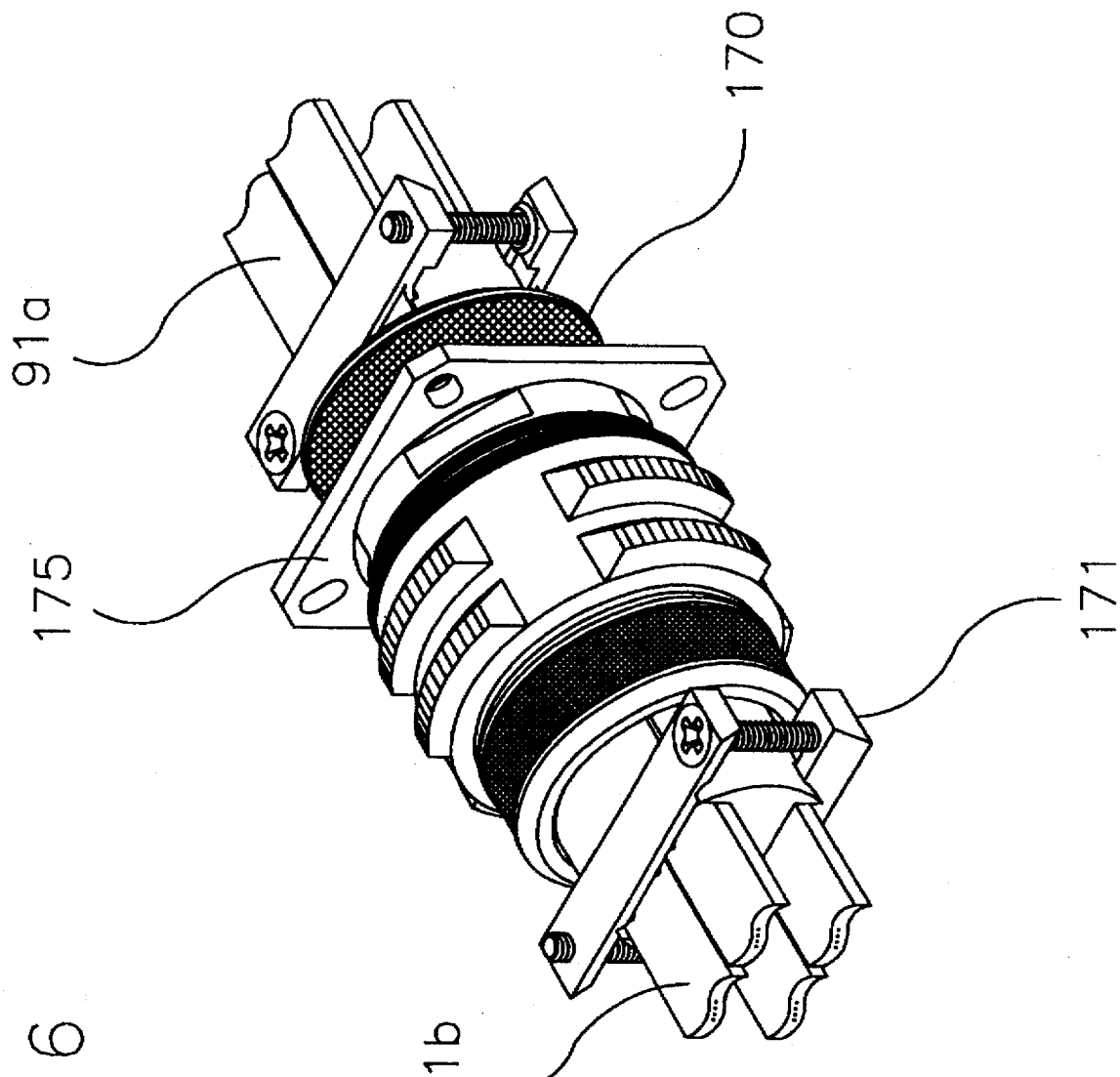
FIG. 16 shows an isometric view of the fully assembled and mated 16-channel connector.

FIG. 16 shows an isometric view of the fully assembled and mated 16-channel connector 175. In this view, the bulkhead is not shown to provide fuller views of the connector itself. FIG. 16 shows the plug assembly 171 fully inserted into the receptacle assembly 170. This fully assembled and mated connector 175 provides a separable connection between the four fiber optic cables 91a and the four fiber optic cables 91b.

In a different preferred embodiment, the MFPs 10, 10a, 10b of the present invention were used to design a 4-channel connector for use in optical backplane applications. This connector builds on the architecture described above. This design provides the means to connect optical fibers in an optical backplane to optical fibers in a module card through a separable connection.

Figure 17:
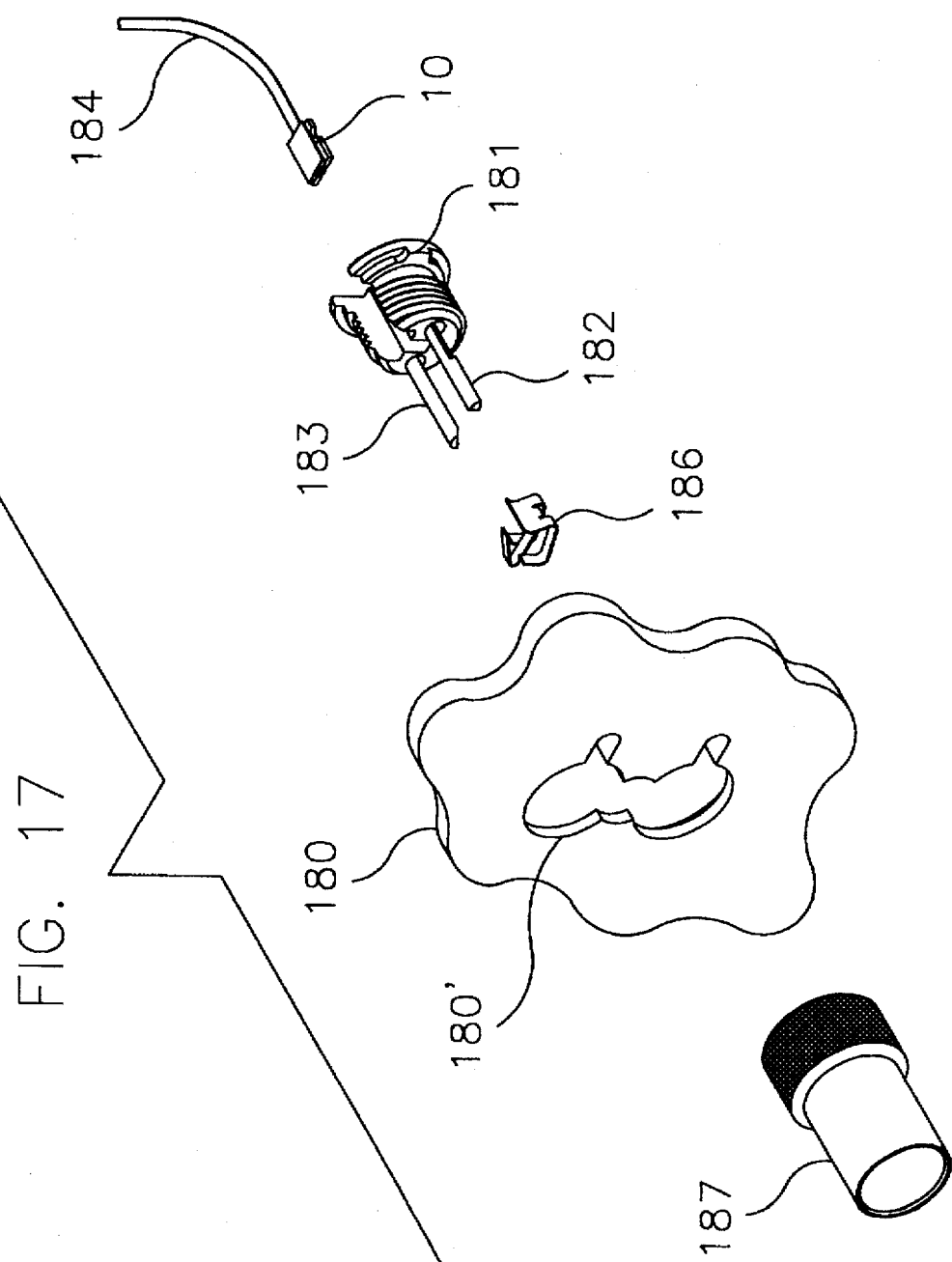
FIG. 17 provides an exploded isometric drawing of the backplane side of a 4-channel optical backplane connector.

FIG. 17 provides an exploded isometric drawing of the backplane side of a 4-channel optical backplane connector. A portion of the optical backplane 180 shows the cutouts 180' that will receive and support the connector half. The backplane carriage 181 provides the assembly frame for several parts prior to insertion into the backplane 180. The front of the backplane carriage has two alignment rails 182 and 183. The 4-channel optical waveguides 184 are terminated into the MFP, shown generically at 10. The MFP 10 with its attached waveguides 184 is placed over the alignment rails 182 and 183. The backplane carriage clip 186 holds the MFP 10 against the bottom surfaces of the alignment rails 182 and 183, and also forces one side of the MFP against the side of rail 182; restated, the backplane carriage clip 181 presses the critical alignment surfaces of the MFP against the receiving surfaces on the alignment rails 182 and 183. The assembled backplane carriage assembly is slipped through the opening in the backplane 180 and secured with the backplane carriage sleeve 187.

Figure 18:
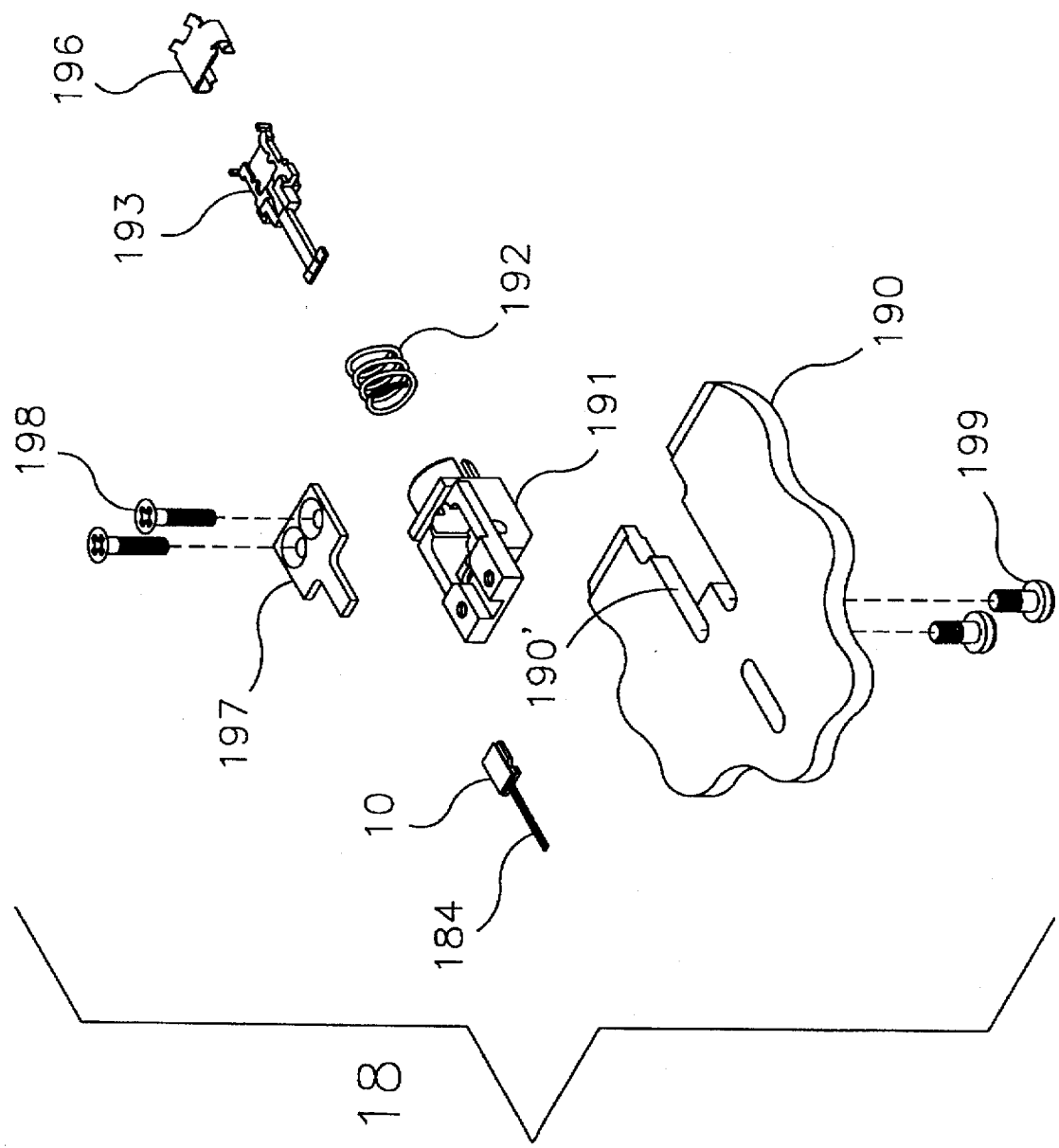
FIG. 18 provides an exploded isometric drawing of the module side of a 4-channel optical backplane connector.

FIG. 18 provides an exploded isometric drawing of the module side of a 4-channel optical backplane connector. A portion of the plug-in module 190 shows the cutouts 190' that will receive and support the connector half. The module carriage 191 provides the assembly frame for several parts prior to insertion into the module 190. The front of the module carriage 191 receives the spring 192 and the floating carrier 193. The floating carrier 193 secures itself and the spring 192 to the module carriage 191 by having its tail captured by an internal ledge in the module carriage. The 4-channel optical waveguides 184 are terminated into the MFP, shown generically at 10. The MFP 10 with its attached waveguides 184 is placed into a pocket in the floating carrier 193. The floating carrier clip 196 holds the MFP 10 into a pocket in the floating carrier 193; after mating, it also holds the MFP 10 against the bottom surfaces of the alignment rails 182 and 183, and also forces one side of the MFP against the side of rail 182; restated, the floating carrier clip 196 presses the critical alignment surfaces of the MFP against the receiving surfaces on the alignment rails 182 and 183. The module cover 197 is attached to the module carriage 191 with the machine screws 198. The assembled module carriage assembly is mounted on the module 190 and secured with the machine screws 199. It should be noted that in an alternate assembly procedure, the module carriage can be attached to the module 190 before the MFP 10 with its associated optical waveguides are attached to the module carriage 191.

In another preferred embodiment, the MFPs 10b of the type shown in FIG. 7 were used to design a 16-channel bulkhead connector housed in a MIL-C-38999 shell size #19. This connector built on a different architecture than described above. In particular, it used polymeric materials to replace many of the metal parts used above; it also used different critical alignment surfaces and techniques. Each connector half includes four MFPs; each MFP handles four optical fibers. In total, this provides 16 optical channels through the connector.

Figure 19:
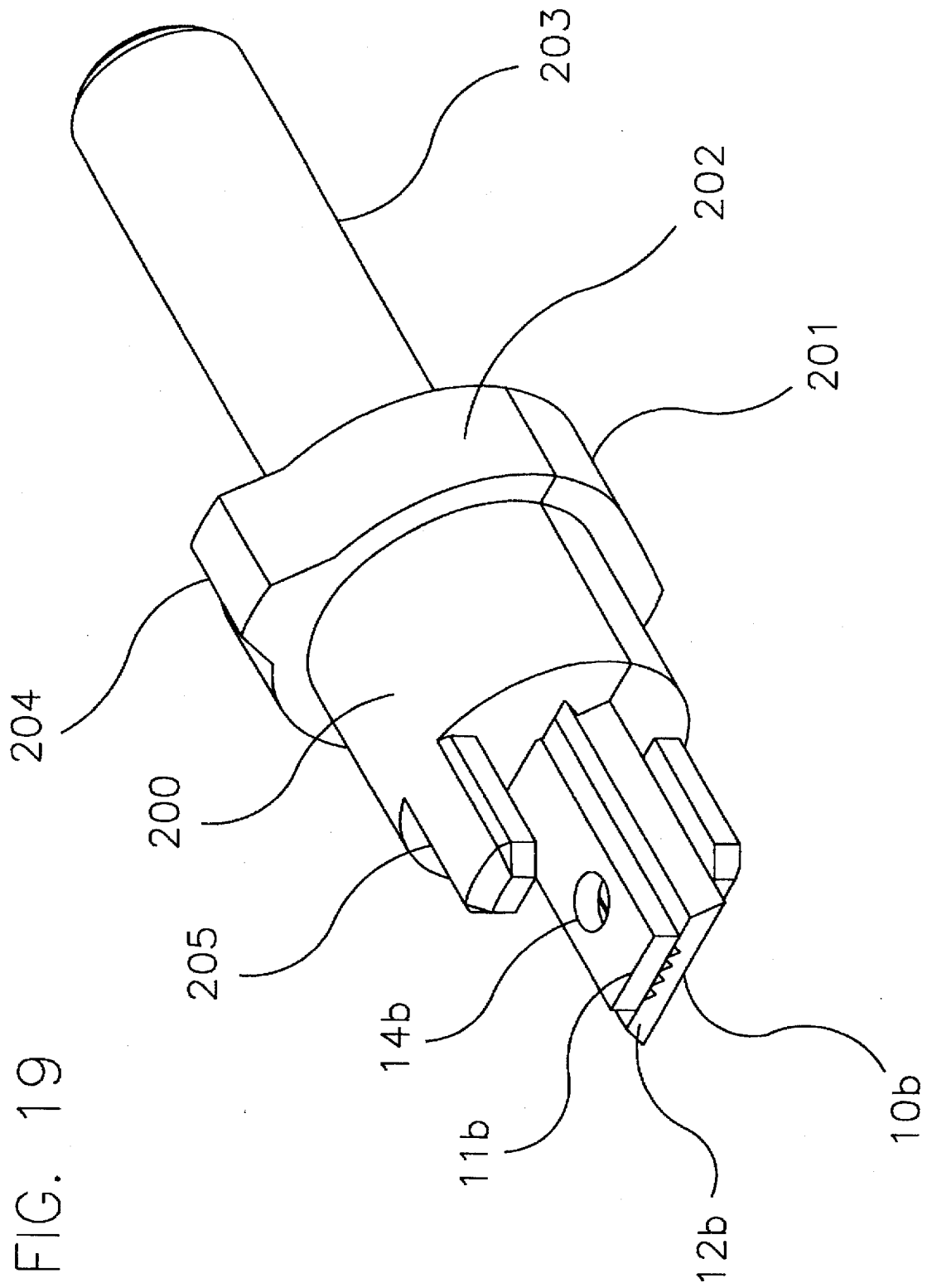
FIG. 19 shows an isometric view of the terminus assembly.

FIG. 19 shows an isometric view of the terminus assembly 200. As illustrated in this figure, the MFP 10b is the critical component within the terminus assembly 200. In turn, the terminus assembly 200 is a critical building block for this version of the connector. The terminus assembly 200 provides support for the MFP 10b and also provides the keys and surfaces to position this assembly within the overall connector. Two hermaphroditic terminus collar pieces 201 and 202 capture and support the MFP 10b; these terminus collars are molded using high-temperature polymeric material. A thin-walled metal terminus sleeve 203 squeezes the tails of the terminus collars 201 and 202 to force a tight gripping of the MFP 10b. The rotational alignment key 204 helps to provide rotational alignment for this terminus assembly 200 within the overall connector. During connector mating, the terminus assembly 200, especially its lead-in guide 205, helps to guide the exposed front portions of the MFP 10b into its alignment sleeve.

Figure 20:
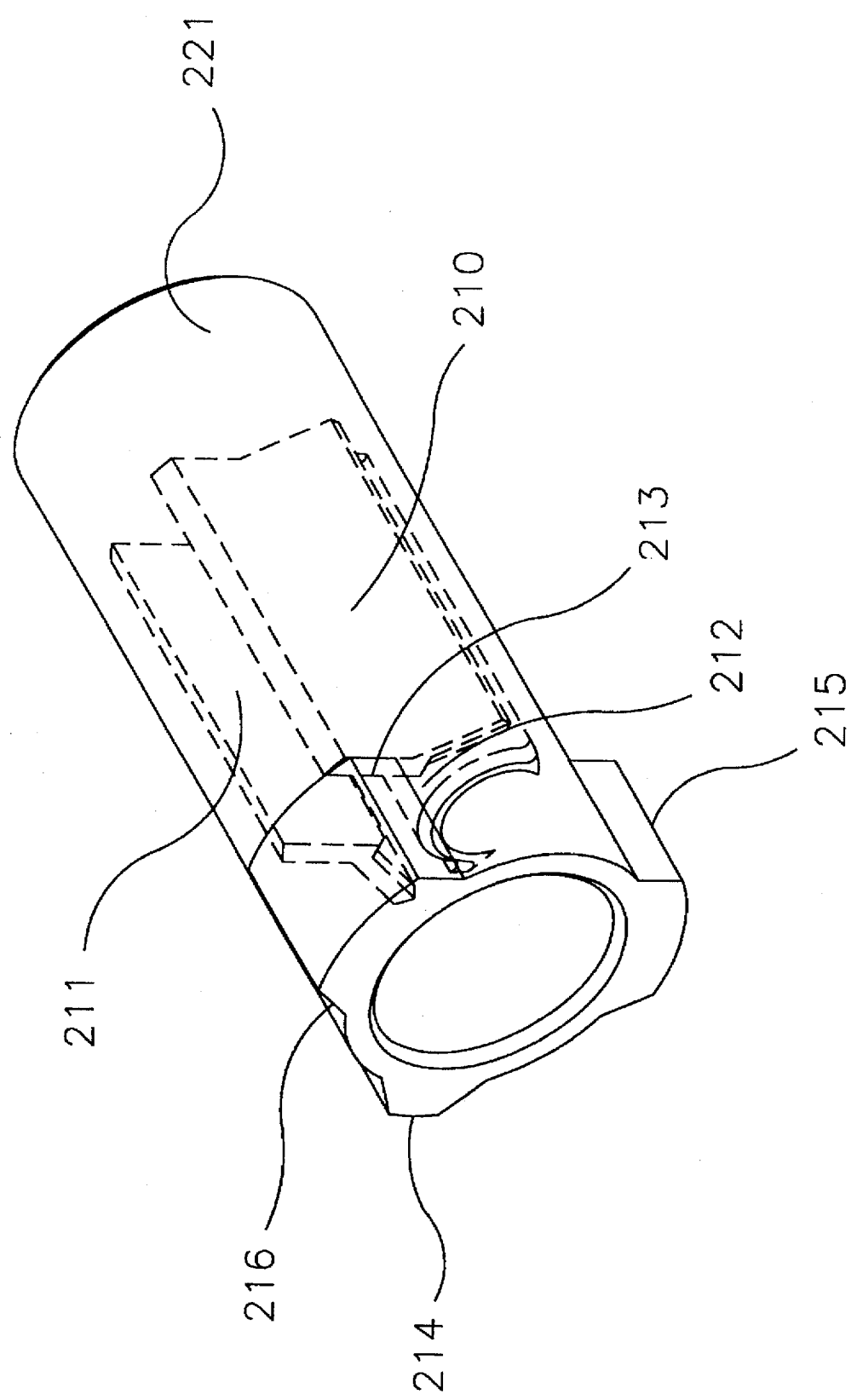
FIG. 20 presents an isometric view of the alignment sleeve.

FIG. 20 presents an isometric view of the alignment sleeve 221 with an indication of its internal structure 210, shown in dashed lines. The alignment sleeve 221 is molded using high-temperature polymeric material. The internal structures 210 provide resilient alignment surfaces 211, 212, and 213 to force the critical surfaces on the mating MFPs 10b into precise alignment. The rotational alignment keys 214, 215, and 216 help to provide rotational alignment for this alignment sleeve 221 within the overall connector. In this embodiment, each alignment sleeve 221 is housed within the MIL-C-38999 plug subassembly.

Figure 21:
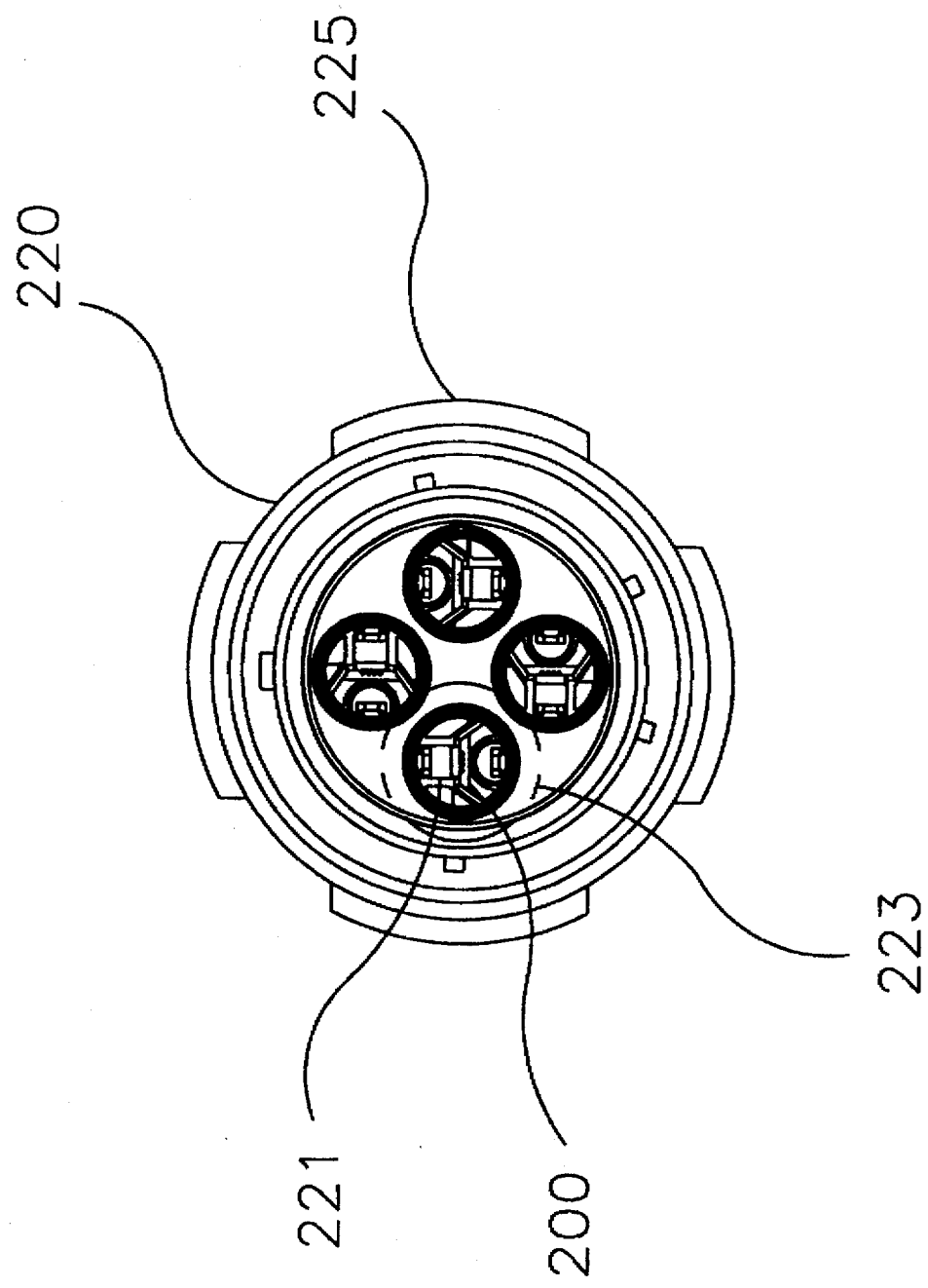
FIG. 21 provides a face view of the 16-channel plug subassembly.
Figure 22:
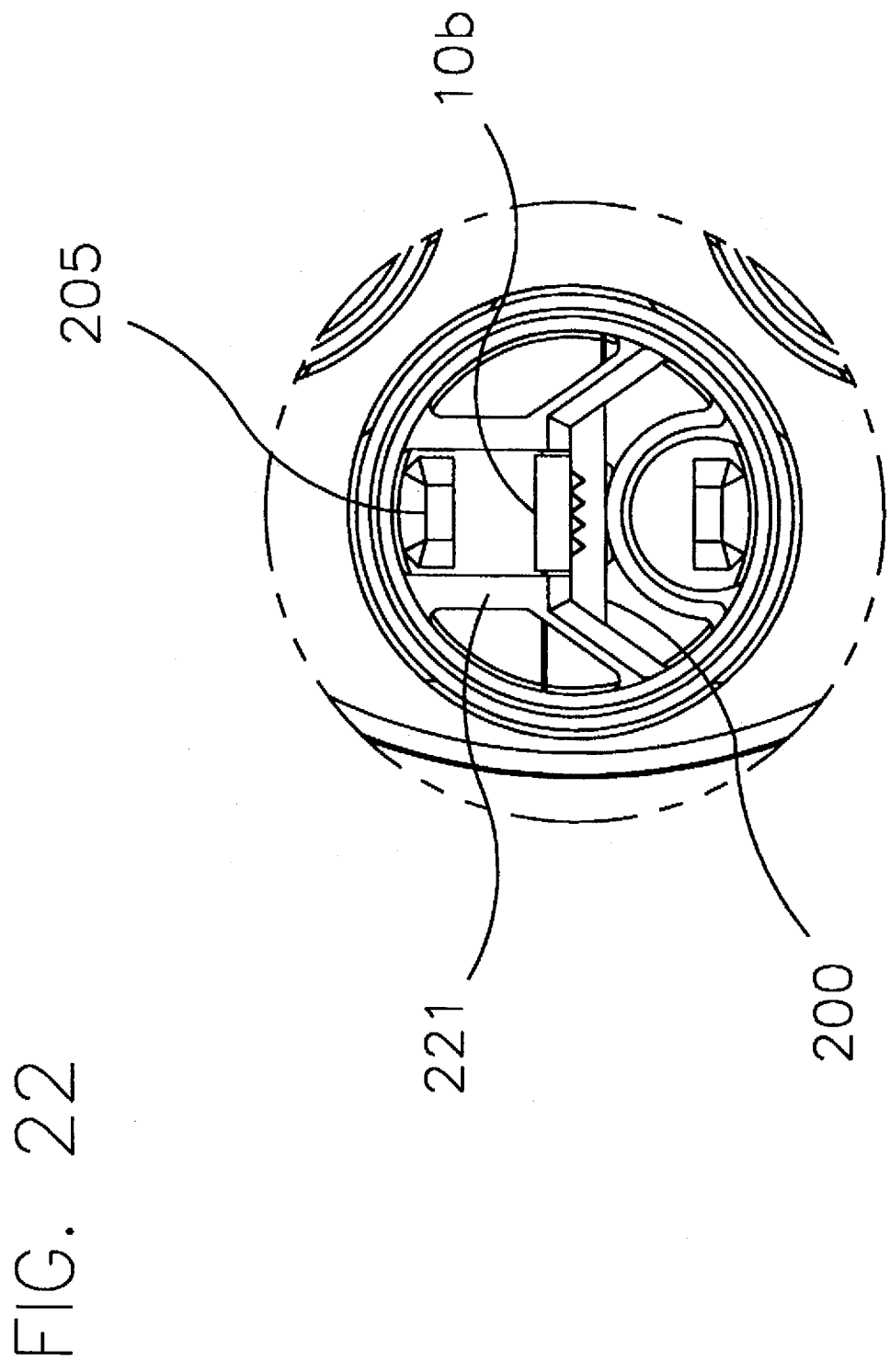
FIG. 22 presents an enlarged detail from the face view of FIG. 21.

FIG. 21 provides a face view of the 16-channel plug subassembly. As shown, the MIL-C-39888 plug shell 220 houses four alignment sleeves 221. Each alignment sleeve 221 houses its terminus assembly 200. The indicated region 223 is shown in the enlarged detail view presented in FIG. 22. This detail view shows the areas of contact between the internal structures of the alignment sleeve 221 and the critical alignment surfaces on the MFP 10b. This detailed face view also shows the lead-in guides 205.

Figure 23:
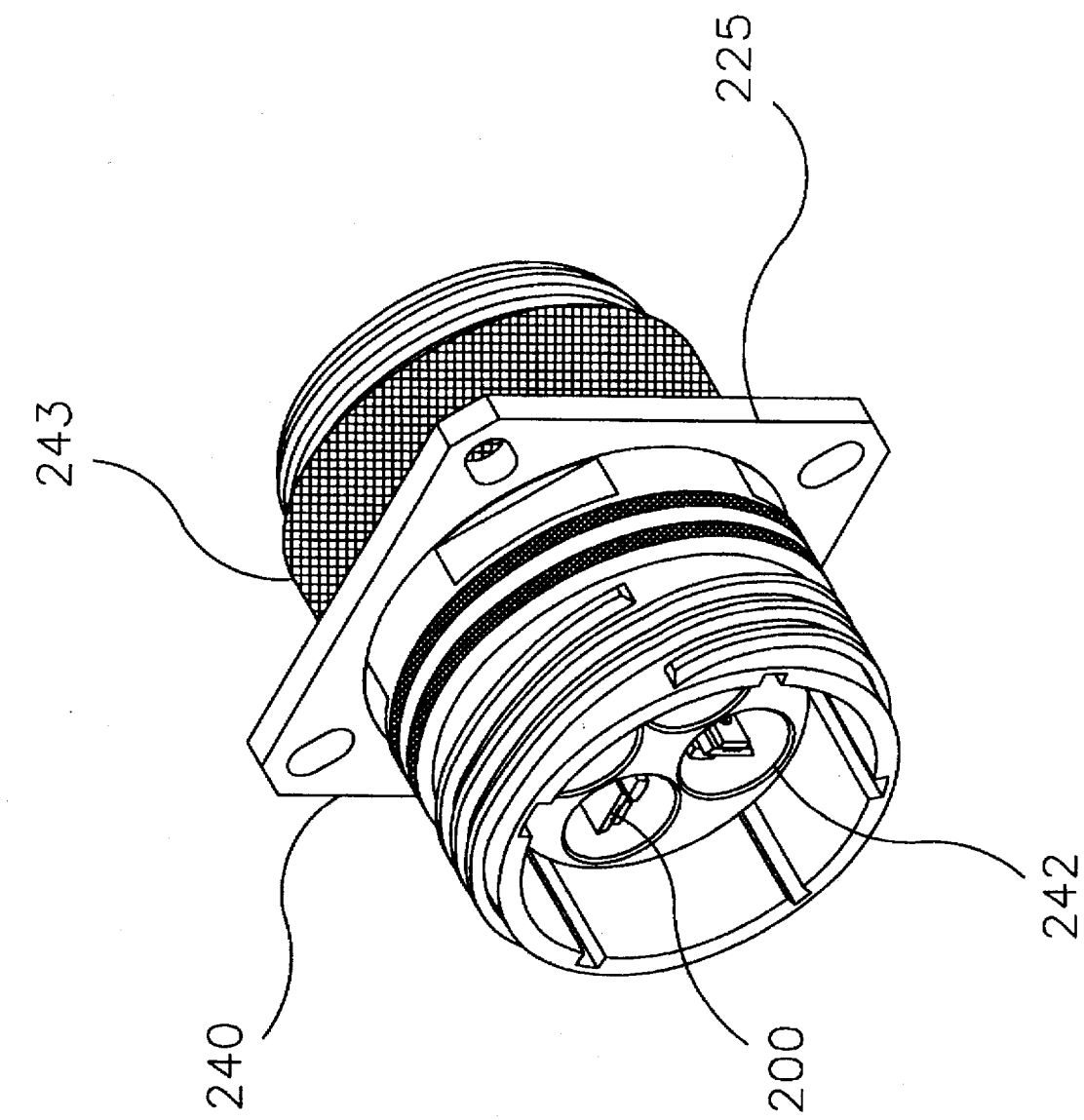
FIG. 23 provides an isometric view of the 16-channel receptacle subassembly.

FIG. 23 provides an isometric view of the 16-channel receptacle subassembly 225. The MIL-C-39888 receptacle shell 240 houses terminus assemblies 200. These terminus assemblies 200 are housed in the receptacle insert 242. In turn, the receptacle insert 242 and its associated parts are held into the receptacle shell 240 with the insert retaining cap 243.

Thus, there has been disclosed a multiple fiber positioner possessing at least one passage to receive an optical fiber. It will be appreciated by those skilled in this art that various changes and modifications of an obvious nature may be made, and all such changes and modifications are considered to fall within the scope of the appended claims.

What is claimed is:

1. A unitary multiple fiber positioner having a base and a permanently attached cover, said cover having a flat inside surface that is attached to said base, said multiple fiber positioner possessing at least one passage to receive, locate, and position at least one optical fiber, each said passage defined by a fiber groove in said base and said flat inside surface of said permanently attached cover, said base comprising a silicon wafer and said fiber grooves being anisotropically partially etched therein.

2. The multiple fiber positioner of claim 1 in which said cover comprises glass or silicon.

3. The multiple fiber positioner of claim 1 in which said cover includes a hole through it to expose a portion of each said fiber groove of each said passage.

4. The multiple fiber positioner of claim. 1 in which said fiber groove is fitted with a lead-in chamfer on at least one end to facilitate threading said optical fiber into said fiber groove.

5. The multiple fiber positioner of claim 1 in which said fiber groove is fitted with a stepped-out region to facilitate inserting said optical fiber through the full length of said fiber groove.

6. The multiple fiber positioner of claim 1 which includes lateral notches in at least one of said cover or base to help secure and lock said multiple fiber positioner into a support structure.

7. The multiple fiber positioner of claim 1 in which said base has sides which are precisely controlled distances from said fiber grooves and in which said cover extends laterally beyond said sides of said base.

8. The multiple fiber positioner of claim 7 in which said base comprises a silicon wafer and said sides of said base are anisotropically totally etched through said silicon wafer.

9. The multiple fiber positioner of claim 1 in which said base has (a) sides which are precisely controlled distances from said fiber grooves and (b) a top, in which said cover has sides, and in which said cover is smaller than said top of said base, thereby leaving exposed shoulders on said top of said base adjacent said sides of said cover.

10. The multiple fiber positioner of claim 9 in which said base comprises a silicon wafer and said sides of said base are anisotropically etched through said silicon wafer.

11. An optical fiber splice connector employing said multiple fiber positioner of claim 1.

12. The optical fiber splice connector of claim 11 in which said multiple fiber positioner is housed in a protective case with means to secure said at least one optical fiber of an optical fiber cable.

13. The optical fiber splice connector of claim 12 in which said optical cable is secured by cable retention posts penetrating locating holes along sides of said optical fiber cable.

14. The optical fiber splice connector of claim 12 which is fitted with environment seals.

15. A separable fiber optic connector which includes a pair of mating multiple fiber positioners of claim 1, each said multiple fiber positioner comprising either:

(a) said base having sides which are precisely controlled distances from said fiber grooves and in which said cover extends laterally beyond said sides of said base; or (b) said base having (a) sides which are precisely controlled distances from said fiber grooves and (b) a top, in which said cover has sides, and in which said cover is smaller than said top of said base, thereby leaving exposed shoulders on said top of said base adjacent said sides of said cover.

16. The separable fiber optic connector of claim 15 in which said multiple fiber positioner is housed in a protective case with means to secure said at least one optical fiber of an optical fiber cable.

17. The separable fiber optic connector of claim 16 in which said optical cable is secured by cable retention posts penetrating locating holes along sides of said optical fiber cable.

18. The separable fiber optic connector of claim 16 is fitted with environment seals.

19. The separable fiber optic connector of claim 15 which is intended for use in bulkheads.

20. The separable fiber optic connector of claim 1 which is intended for use in backplanes.

* * * * *